(12) United States Patent
Lin

(10) Patent No.: US 12,113,300 B2
(45) Date of Patent: *Oct. 8, 2024

(54) DOPPLER MOTION SENSOR DEVICE WITH HIGH ISOLATION BETWEEN ANTENNAS

(71) Applicant: RichWave Technology Corp., Taipei (TW)

(72) Inventor: Shih-Kai Lin, Taipei (TW)

(73) Assignee: RichWave Technology Corp., Taipei (TW)

( * ) Notice: Subject to any disclaimer, the term of this patent is extended or adjusted under 35 U.S.C. 154(b) by 441 days.

This patent is subject to a terminal disclaimer.

(21) Appl. No.: 17/519,584

(22) Filed: Nov. 5, 2021

(65) Prior Publication Data

US 2022/0059936 A1    Feb. 24, 2022

Related U.S. Application Data

(63) Continuation-in-part of application No. 16/408,358, filed on May 9, 2019, now Pat. No. 11,194,037.
(Continued)

(51) Int. Cl.
*H01Q 5/35*        (2015.01)
*G01S 7/03*        (2006.01)
(Continued)

(52) U.S. Cl.
CPC .............. *H01Q 5/35* (2015.01); *G01S 7/032* (2013.01); *G01S 13/46* (2013.01); *H01Q 1/38* (2013.01);
(Continued)

(58) Field of Classification Search
CPC .... H01Q 1/3233; H01Q 1/38; H01Q 21/0006; H01Q 21/065; H01Q 21/0075;
(Continued)

(56) References Cited

U.S. PATENT DOCUMENTS 5,262,783 A    11/1993  Philpott
5,977,874 A    11/1999  Konstandelos
(Continued)

FOREIGN PATENT DOCUMENTS

CN    104037500 A    9/2014
CN    104282993 A    1/2015
(Continued)

OTHER PUBLICATIONS

Office action mailed/issued on Mar. 2, 2022 for CN application No. 201910384246.6, filing date: May 9, 2019, pp. 1-12. ,Mar. 2, 2022.
(Continued)

*Primary Examiner* — Olumide Ajibade Akonai
(74) *Attorney, Agent, or Firm* — Winston Hsu

(57) ABSTRACT

A Doppler motion sensor device is used for detecting a motion of an object. The Doppler motion sensor device includes a first antenna and a second antenna. The first antenna is used to transmit or receive a first wireless signal. The second antenna is used to transmit or receive a second wireless signal. A first straight line passing through a first feed-in point and a first middle point of the first antenna is orthogonal to a second straight line passing through a second feed-in point and a second middle point of the second antenna. One of the first wireless signal and the second wireless signal is a transmission signal. The transmission signal is reflected by the object to form the other one of the first wireless signal and the second wireless signal.

20 Claims, 32 Drawing Sheets

Related U.S. Application Data

(60) Provisional application No. 62/669,390, filed on May 10, 2018.

(51) Int. Cl.
*G01S 13/46* (2006.01)
*H01Q 1/38* (2006.01)
*H01Q 9/04* (2006.01)
*H01Q 21/06* (2006.01)

(52) U.S. Cl.
CPC ......... *H01Q 9/0414* (2013.01); *H01Q 21/065* (2013.01); *G01S 2013/466* (2013.01)

(58) Field of Classification Search
CPC ...... H01Q 21/00; H01Q 9/0457; H01Q 21/08; H01Q 9/045; H01Q 15/24; G01S 13/931; G01S 7/032; G01S 7/03; G01S 3/04; G01S 7/024
See application file for complete search history.

(56) References Cited

U.S. PATENT DOCUMENTS

| | | | |
|---|---|---|---|
| 6,052,086 A * | 4/2000 | Kudoh | H01Q 23/00 343/700 MS |
| 6,437,742 B1 | 8/2002 | Niesen | |
| 7,098,842 B2 * | 8/2006 | Nakazawa | G01S 7/032 342/175 |
| 9,318,811 B1 | 4/2016 | Fluhler | |
| 2011/0309973 A1 | 12/2011 | Barrick | |
| 2015/0323696 A1 | 11/2015 | Cole | |
| 2016/0154097 A1 * | 6/2016 | Pu | G01S 7/03 342/27 |
| 2016/0327644 A1 | 11/2016 | Pu | |
| 2016/0365631 A1 | 12/2016 | Huang | |
| 2017/0149133 A1 | 5/2017 | Huang | |
| 2019/0339384 A1 * | 11/2019 | Peng | G08G 5/0069 |
| 2020/0358207 A1 | 11/2020 | Baur | |

FOREIGN PATENT DOCUMENTS

| | | | | |
|---|---|---|---|---|
| CN | 204156084 U | 2/2015 | | |
| CN | 106159446 A | 11/2016 | | |
| CN | 106233532 A | 12/2016 | | |
| EP | 1 804 335 A1 | 7/2007 | | |
| EP | 2857857 A1 * | 4/2015 | ......... | G01S 13/0209 |
| KR | 10-2014-0087472 A | 7/2014 | | |
| TW | 201445812 A | 12/2014 | | |
| TW | M497350 U | 3/2015 | | |
| TW | 201530898 A | 8/2015 | | |
| TW | 201628350 A | 8/2016 | | |
| TW | 201635643 A | 10/2016 | | |
| TW | 202010180 A | 3/2020 | | |
| TW | 202118144 A | 5/2021 | | |
| TW | 202127735 A | 7/2021 | | |
| WO | WO-2012143761 A1 * | 10/2012 | ........... | G01S 13/426 |

OTHER PUBLICATIONS

Notice of Allowance mailed on Jun. 1, 2022 for the Taiwan application No. 110146530, filing date Dec. 13, 2021, pp. 1-4, Jun. 1, 2022.

* cited by examiner

DOPPLER MOTION SENSOR DEVICE WITH HIGH ISOLATION BETWEEN ANTENNAS

CROSS REFERENCE TO RELATED APPLICATION

This is a continuation-in-part (CIP) application of and claims priority of U.S. application Ser. No. 16/408,358 filed on May 5, 2019, which claims priority to provisional U.S. Application No. 62/669,390 filed on May 5, 2010. The above applications are incorporated herein by reference in their entirety.

TECHNICAL FIELD

The disclosure is related to a Doppler motion sensor device, and more particularly, a Doppler motion sensor device with high isolation.

BACKGROUND

When a radar device including a transmission (Tx) antenna and a reception (Rx) antenna is operated, the radar device can transmit signals by the transmission antenna and receive signals by the reception antenna at the same time. The transmitted signals are transmitted for detecting an object, and the received signals are received for analyzing whether the signals transmitted beforehand have been bounced off the surface of an object so as to detect the object accordingly.

Because the transmitted signals and the received signals have substantially the same frequency, and the radar device transmits and receives signals at the same time, the isolation between the transmission antenna and the reception antenna is important. If the isolation is insufficient, the reception antenna will incorrectly receive the signals just transmitted from the transmission antenna.

For increasing the isolation between the transmission antenna and the reception antenna, the two antennas can be separated by a long distance. Furthermore, the transmission antenna and the reception antenna can be coupled to two different ground planes to increase the isolation, and a sensor circuit coupled to the transmission antenna and the reception antenna can be coupled to yet another ground plane to further increase the isolation. The long distance between the two antennas and the plurality of ground planes will lead to an excessive device size, and unwanted power loss will be induced because longer conduction wires will be needed.

SUMMARY

An embodiment provides a radar device for detecting spatial information of an object. The radar device comprises a first antenna and a second antenna. The first antenna is configured to access a first wireless signal and comprises a first middle point and a feed zone, where the first middle point is at a centroid of the first antenna; and the feed zone has a first zone shape centroid and is configured to access a first internal signal corresponding to the first wireless signal between the first antenna and a sensor circuit. The second antenna is configured to access a second wireless signal and comprises a second middle point and another feed zone, where the second middle point is at a centroid of the second antenna; and the another feed zone has a second zone shape centroid and is configured to access a second internal signal corresponding to the second wireless signal between the second antenna and the sensor circuit. An angle formed between a first straight line and a second straight line is not less than 45 degrees and is not larger than 90 degrees. The first straight line passes through the first zone shape centroid and the first middle point, and the second straight line passes through the second zone shape centroid and the second middle point. One of the first wireless signal and the second wireless signal is reflected by the object to form another one of the first wireless signal and the second wireless signal. The sensor circuit is configured to detect the spatial information of the object according to at least the first internal signal and the second internal signal.

Another embodiment provides a radar device for detecting spatial information of an object. The radar device comprises a first antenna and a second antenna. The first antenna is configured to access a first wireless signal and form a first radiated electric-field having a first co-polarization according to the first wireless signal. The first antenna comprises a feed zone configured to access a first internal signal corresponding to the first wireless signal between the first antenna and a sensor circuit. The second antenna is configured to access a second wireless signal and form a second radiated electric-field having a second co-polarization according to the second wireless signal. The second antenna comprises another feed zone configured to access a second internal signal corresponding to the second wireless signal between the second antenna and the sensor circuit. An angle formed between the first co-polarization and the second co-polarization is not less than 45 degrees and is not larger than 90 degrees in a far field. One of the first wireless signal and the second wireless signal is reflected by the object to form another one of the first wireless signal and the second wireless signal. The sensor circuit is configured to detect the spatial information of the object according to at least the first internal signal and the second internal signal.

DETAILED DESCRIPTION

Figure 1:
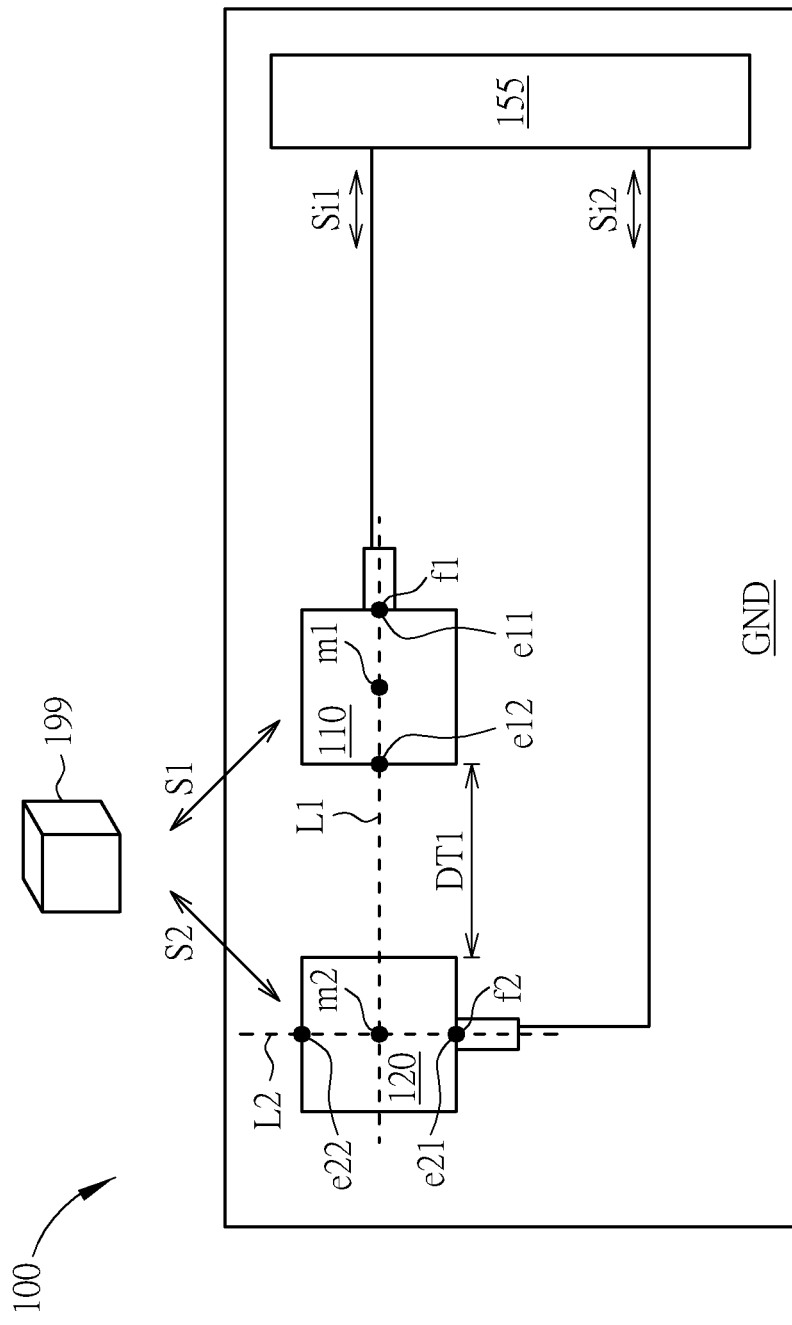
FIG. 1 illustrates a Doppler motion sensor device according to an embodiment.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

FIG. 1 illustrates a Doppler motion sensor device 100 according to an embodiment. The embodiment provides a Doppler motion sensor device 100 for detecting the motion of an object 199. The Doppler motion sensor device 100 may include a first antenna 110 and a second antenna 120. The first antenna 110 may be used to transmit or receive a first wireless signal S1. The first antenna 110 may include a first middle point m1 and a first feed-in point f1. The first middle point m1 may be at a centroid of the first antenna 110. The first feed-in point f1 may be coupled to a sensor circuit 155 and be used to access a first internal signal Si1 corresponding to the first wireless signal S1. The second antenna 120 may be used to transmit or receive a second wireless signal S2. The second antenna 120 may include a second middle point m2 and a second feed-in point f2. The second middle point m2 may be at a centroid of the second antenna 120. The second feed-in point f2 may be coupled to the sensor circuit 155 and be used to access a second internal signal Si2 corresponding to the second wireless signal S2. A first straight line L1 passing through the first feed-in point f1 and the first middle point m1 may be orthogonal to a second straight line L2 passing through the second feed-in point f2 and the second middle point m2. The first straight line L1 may optionally pass through the second middle point m2.

In FIG. 1, one of the first wireless signal S1 and the second wireless signal S2 may be a transmission signal, the transmission signal is reflected by the object 199 to form the other one of the first wireless signal S1 and the second wireless signal S2. The sensor circuit 155 may be used to detect the motion of the object 199 according to at least the first internal signal Si1 and the second internal signal Si2. Hence, the detection may be based on Doppler effect. A frequency of the first wireless signal S1 may be substantially identical to a frequency of the second wireless signal S2. In detail, a frequency of the first wireless signal S1 may be similar to a frequency of the second wireless signal S2, and a tiny frequency shift between the first wireless signal S1 and the second wireless signal S2 could be presented because of Doppler effect. According to the frequency of the used signals, the Doppler motion sensor device may be a microwave (MW) sensor device. In this embodiment, the frequency of the wireless signal S1/S2 transmitted by the corresponding antenna 110/120 could be stable over time.

According to an embodiment, the first antenna 110 of FIG. 1 may be used to transmit the first wireless signal S1, and the second antenna 120 of FIG. 1 may be used to receive the second wireless signal S2 simultaneously. In other words, in this embodiment, the first antenna 110 may be a transmission antenna, and the second antenna 120 may be a reception antenna.

According to another embodiment, the first antenna 110 of FIG. 1 may be used to receive the first wireless signal S1, and the second antenna may be used to transmit the second wireless signal S2 simultaneously. In other words, in this embodiment, the first antenna 110 may be a reception antenna, and the second antenna 120 may be a transmission antenna.

As shown in FIG. 1, according to an embodiment, a common voltage plane GND may be coupled to the first antenna 110 and the second antenna 120 for providing a common voltage. According to an embodiment, the common voltage plane GND may be further coupled to the sensor circuit 155 for providing the common voltage. In one embodiment, the first straight line L1 being orthogonal to the second straight line L2 comprises a projection of the first straight line L1 on a reference surface being orthogonal to a projection of the second straight line L2 on the reference surface. For example, a projection of the first straight line L1 on the common voltage plane GND may be orthogonal to a projection of the second straight line L2 on the common voltage plane GND.

According to an embodiment, wavelengths of the first wireless signal S1 and the second wireless signal S2 may be λ. The first antenna 110 and the second antenna 120 may be separated with a distance DT1. The distance DT1 between the first antenna 110 and the second antenna 120 may be between λ/16 and 3λ. It may be expressed as λ/16≤DT1≤3λ.

According to an embodiment, the first antenna 110 and the second antenna 120 may be formed on an antenna layer. The common voltage plane GND may be formed on a common layer. A substrate may be formed on an insulation layer disposed between the antenna layer and the common layer. The common voltage plane GND may be coupled to the first antenna 110 and the second antenna 120 for providing the common voltage. The mentioned layer may be a physical layer (such as a conductive layer or a metal layer of a printed circuit board) or a non-physical layer of a design. In one embodiment, the common voltage plane GND may be a common ground plane, the common voltage may be a ground voltage, and the common layer may be a ground layer.

Regarding the disposition of the feed-in points, as shown in FIG. 1, the first feed-in point f1 and the second feed-in point f2 may be respectively disposed at an edge point e11 of the first antenna 110 and an edge point e21 of the second antenna 120. However, according to an embodiment, the first feed-in point f1 may be disposed at the edge point e12 which is on the straight line L1 and at a side opposite to the side the edge point e11 is on. The second feed-in point f2 may be disposed at the edge point e22 which is on the straight line L2 and at a side opposite to the side the edge point e21 is on. The relocation of the feed-in points f1, f2 may not affect quality of signals because of the polarizations of the antennas. Likewise, in FIG. 2 to FIG. 10 described below, each feed-in point may be adjusted to be disposed at a suitable edge point at an opposite side.

By setting the first antenna 110 and the second antenna 120 regarding the feed-in point f1 and the feed-in point f2 with a suitable layout, the polarizations of the first antenna 110 and the second antenna 120 will lead to sufficient isolation between the first antenna 110 and the second antenna 120. The two antennas 110 and 120 no longer need to be separated by a long distance. Furthermore, the first antenna 110 and the second antenna 120 can be coupled to the same common voltage plane without deteriorating the quality of signals. Hence, the problem of prior art may be overcome. Some other embodiments are described below.

Figure 2:
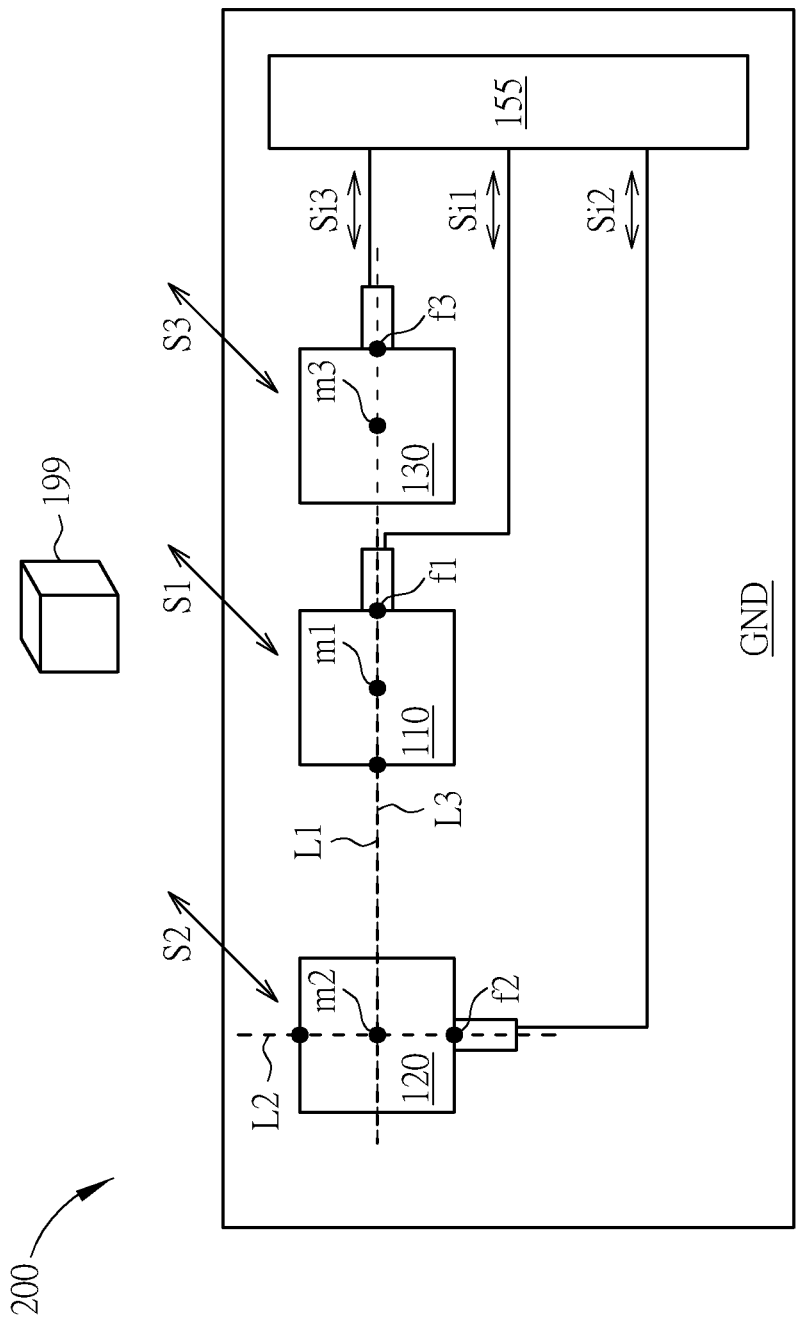
FIG. 2 illustrates a Doppler motion sensor device according to another embodiment.

FIG. 2 illustrates a Doppler motion sensor device 200 according to another embodiment. The Doppler motion sensor device 200 may be used to detect a motion of the object 199 and may include more antennas than that of the Doppler motion sensor device 100 of FIG. 1.

In FIG. 2, the first antenna 110 and the second antenna 120 may be set as shown in FIG. 1. According to an embodiment, the Doppler motion sensor device 200 may include three antennas. The Doppler motion sensor device 200 may further include a third antenna 130 for transmitting or receiving a third wireless signal S3. The third antenna 130 may include a third middle point m3 and a third feed-in point f3. The third middle point m3 may be at a centroid of the third antenna 130. The third feed-in point f3 may be coupled to the sensor circuit 155 for accessing a third internal signal Si3 corresponding to the third wireless signal S3. The first straight line L1 passing through the first feed-in point f1, the first middle point m1, and the second middle point m2 and orthogonal to the second straight line L2 in FIG. 1 may also pass through the third middle point m3 and the third feed-in point f3. The third straight line L3 may pass through the third middle point m3 and the third feed-in point f3.

According to an embodiment, the first antenna 110 may be used to transmit the first wireless signal S1, the second antenna 120 may be used to receive the second wireless signal S2, and the third antenna 130 may be used to transmit the third wireless signal S3 simultaneously. According to another embodiment, the first antenna 110 may be used to receive the first wireless signal S1, the second antenna 120 may be used to transmit the second wireless signal S2, and the third antenna 130 may be used to receive the third wireless signal S3 simultaneously. In FIG. 2, the sensor circuit 155 may be used to analyze the motion of the object 199 by analyzing the internal signals Si1, Si2 and Si3.

Figure 3:
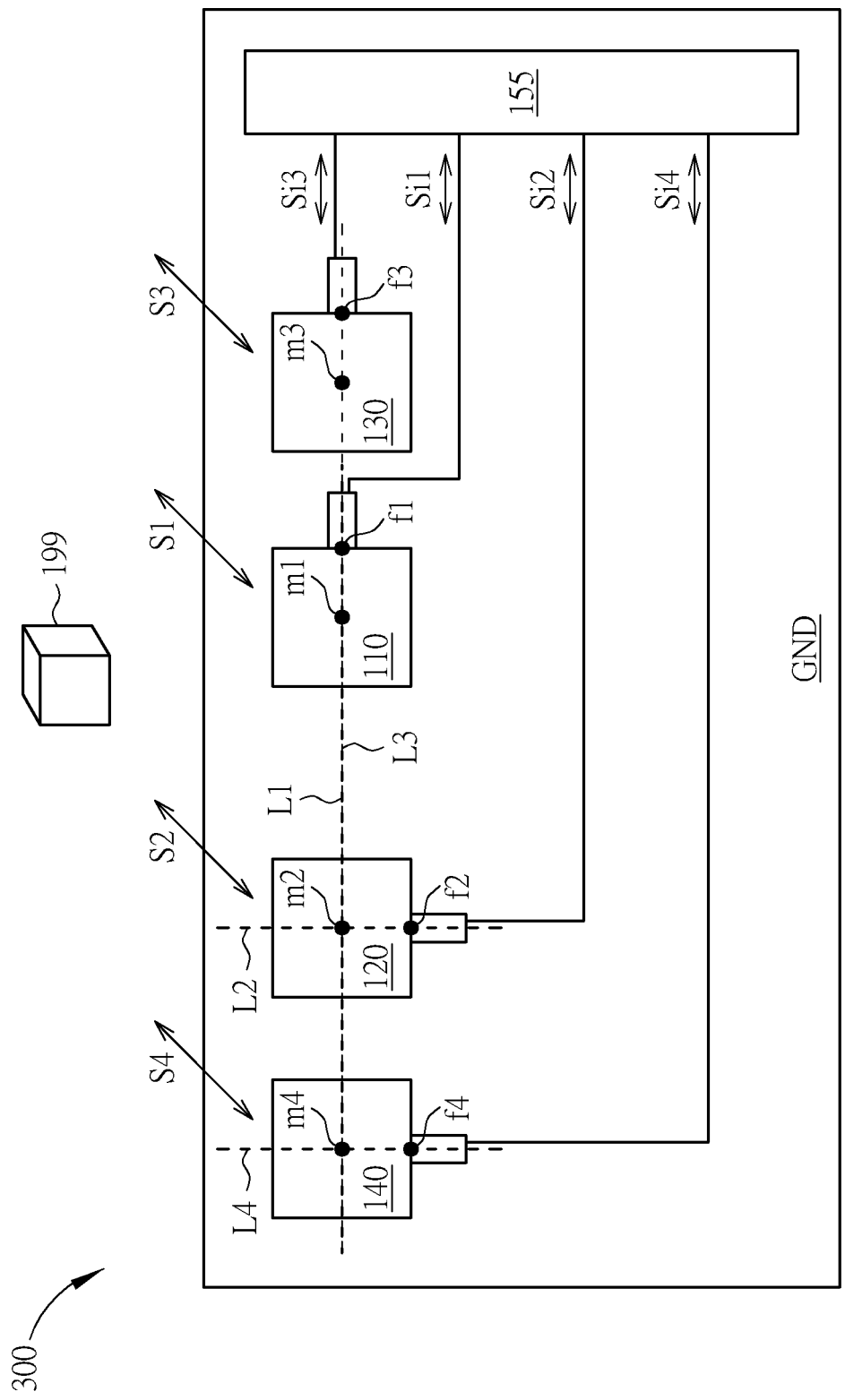
FIG. 3 illustrates a Doppler motion sensor device according to another embodiment.

FIG. 3 illustrates a Doppler motion sensor device 300 according to another embodiment. The Doppler motion sensor device 300 may have more antennas than that of the Doppler motion sensor device 200 of FIG. 2.

As shown in FIG. 3, the Doppler motion sensor device 300 may include four antennas. The Doppler motion sensor device 300 may further include a fourth antenna 140. In FIG. 3, the settings of the antennas 110 to 130 may be similar to that in FIG. 2, so the settings are not repeatedly described. The fourth antenna 140 may be used to transmit or receive a fourth wireless signal S4. The fourth antenna 140 may include a fourth middle point m4 and a fourth feed-in point f4. The fourth middle point m4 may be at a centroid of the fourth antenna 140. The fourth feed-in point f4 may be coupled to the sensor circuit 155 and for accessing a fourth internal signal Si4 corresponding to the fourth wireless signal S4. The first straight line L1 in FIG. 2 may further pass through the fourth middle point m4 and be orthogonal to a fourth straight line L4 passing through the fourth middle point m4 and the fourth feed-in point f4.

According to an embodiment, in FIG. 3, the first antenna 110 may be used to transmit the first wireless signal S1, the second antenna 120 may be used to receive the second wireless signal S2, the third antenna 130 may be used to transmit the third wireless signal S3, and the fourth antenna 140 may be used to receive the fourth wireless signal S4 simultaneously. According to another embodiment, in FIG. 3, the first antenna 110 may be used to receive the first wireless signal S1, the second antenna 120 may be used to transmit the second wireless signal S2, the third antenna 130 may be used to receive the third wireless signal S3, and the fourth antenna 140 may be used to transmit the fourth wireless signal S4 simultaneously. In FIG. 3, the sensor circuit 155 may be used to analyze the motion of the object 199 by analyzing the internal signals Si1, Sit, Si2 and Si4.

Figure 4:
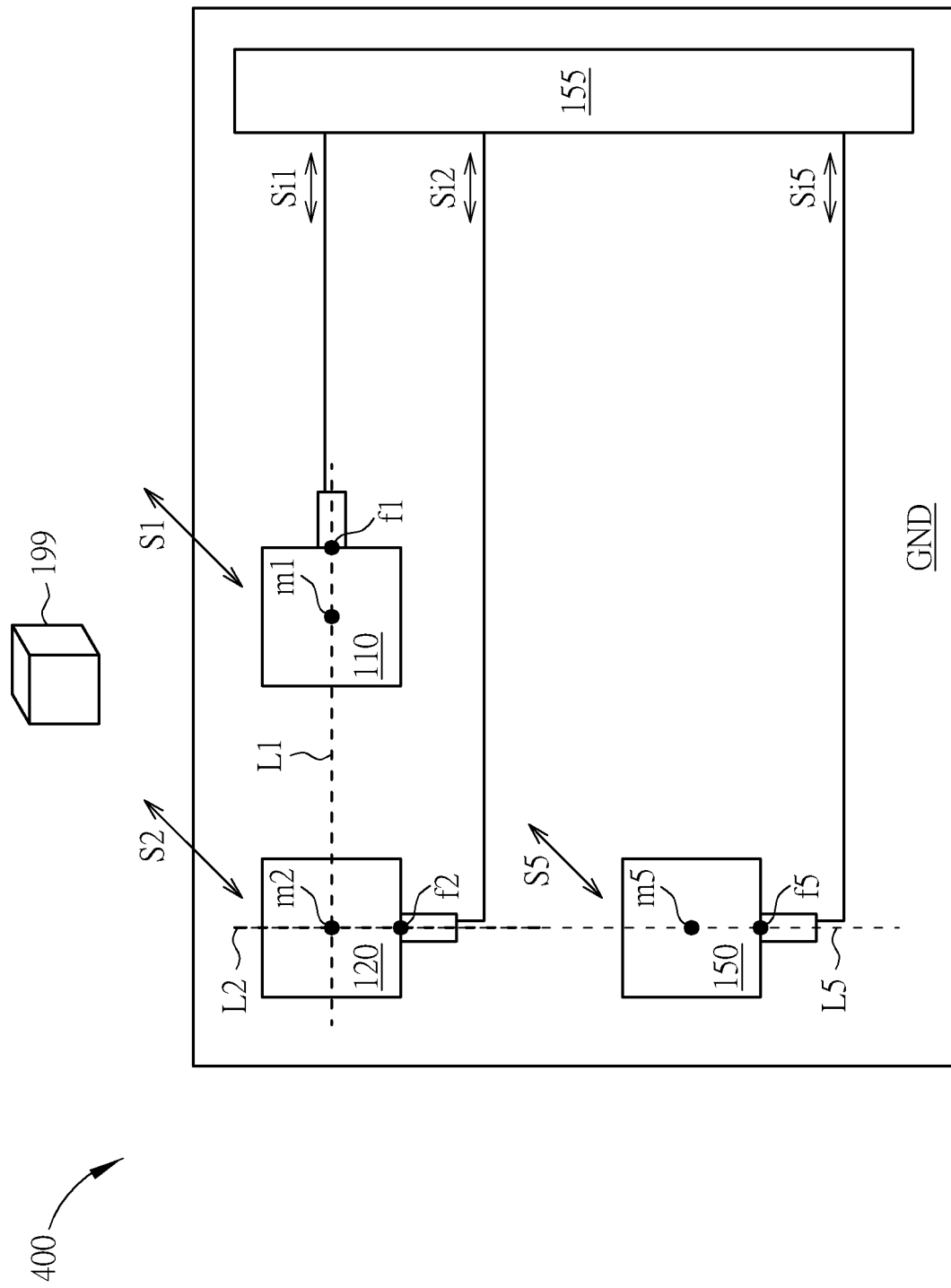
FIG. 4 illustrates a Doppler motion sensor device according to another embodiment.

FIG. 4 illustrates a Doppler motion sensor device 400 according to another embodiment. The Doppler motion sensor device 400 may include the first antenna 110 and the second antenna 120 shown in FIG. 1, so the settings of the first antenna 110 and the second antenna 120 are not repeatedly described. The Doppler motion sensor device 400 may further include a fifth antenna 150 for transmitting or receiving a fifth wireless signal S5. The fifth antenna 150 may include a fifth middle point m5 and a fifth feed-in point f5. The fifth middle point m5 may be at a centroid of the fifth antenna 150. The fifth feed-in point f5 may be coupled to the sensor circuit 155 for accessing a fifth internal signal S15 corresponding to the fifth wireless signal S5. A fifth straight line L5 passing through the fifth middle point m5 and the fifth feed-in point f5 may pass through the second middle point m2 and the second feed-in point f2 and is orthogonal to the first straight line L1.

In FIG. 4, according to an embodiment, the first antenna 110 may be used to transmit the first wireless signal S1, the second antenna 120 may be used to receive the second wireless signal S2, and the fifth antenna 150 may be used to receive the fifth wireless signal S5 simultaneously. In FIG. 4, according to another embodiment, the first antenna 110 may be used to receive the first wireless signal S1, the second antenna 120 may be used to transmit the second wireless signal S2, and the fifth antenna 150 may be used to transmit the fifth wireless signal S5 simultaneously.

In FIG. 4, the sensor circuit 155 may be used to analyze the motion of the object 199 by analyzing the internal signals Si1, Si2 and Si5.

Figure 5:
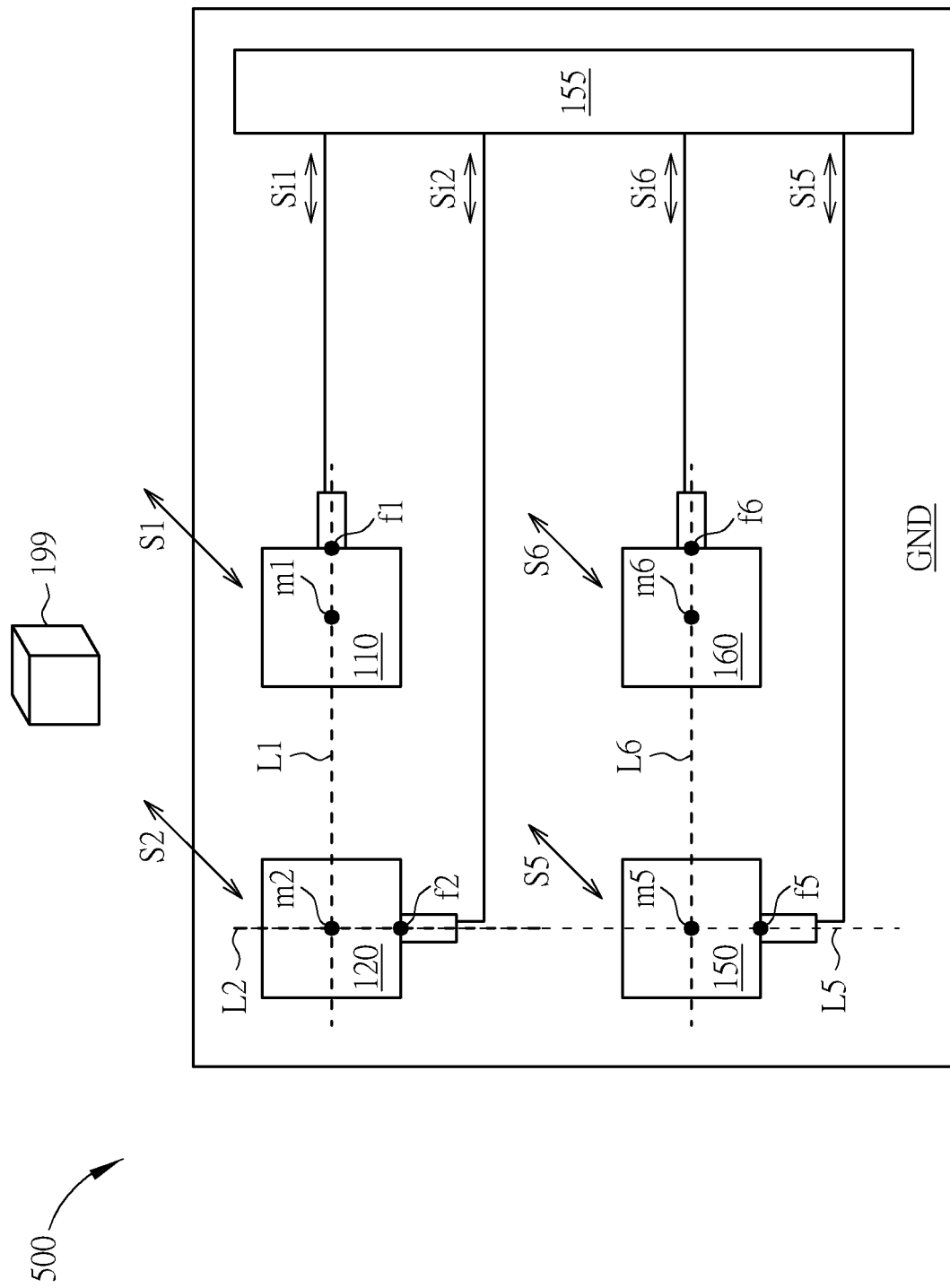
FIG. 5 illustrates a Doppler motion sensor device according to another embodiment.

FIG. 5 illustrates a Doppler motion sensor device 500 according to another embodiment. The Doppler motion sensor device 500 may include the first antenna 110, the second antenna 120 and the fifth antenna 150 of FIG. 4, so the settings of the three antennas 110, 120 and 150 are not repeatedly described. Comparing with FIG. 4, the Doppler motion sensor device 500 in FIG. 5 may further include a sixth antenna 160 for transmitting or receiving a sixth wireless signal S6. The sixth antenna 160 may include a sixth middle point m6 and a sixth feed-in point f6. The sixth middle point m6 may be at a centroid of the sixth antenna 160. The sixth feed-in point f6 may be coupled to the sensor circuit 155 for accessing a sixth internal signal S16 corresponding to the sixth wireless signal S6. A sixth straight line L6 passing through the sixth middle point m6 and the sixth feed-in point f6 may pass through the fifth middle point m5 and be orthogonal to the fifth straight line L5.

Regarding the directions of the wireless signals in FIG. 5, according to an embodiment, the first antenna 110 may be used to transmit the first wireless signal S1, the second antenna 120 may be used to receive the second wireless signal S2, the fifth antenna 150 may be used to receive the fifth wireless signal S5, and the sixth antenna 160 may be used to transmit the sixth wireless signal S6 simultaneously.

According to another embodiment, in FIG. 5, the first antenna 110 may be used to receive the first wireless signal S1, the second antenna 120 may be used to transmit the second wireless signal S2, the fifth antenna 150 may be used to transmit the fifth wireless signal S5, and the sixth antenna 160 may be used to receive the sixth wireless signal S6 simultaneously.

In FIG. 5, the sensor circuit 155 may be used to analyze the motion of the object 199 by analyzing the internal signals Si1, Si2, Si5 and Si6.

Figure 6:
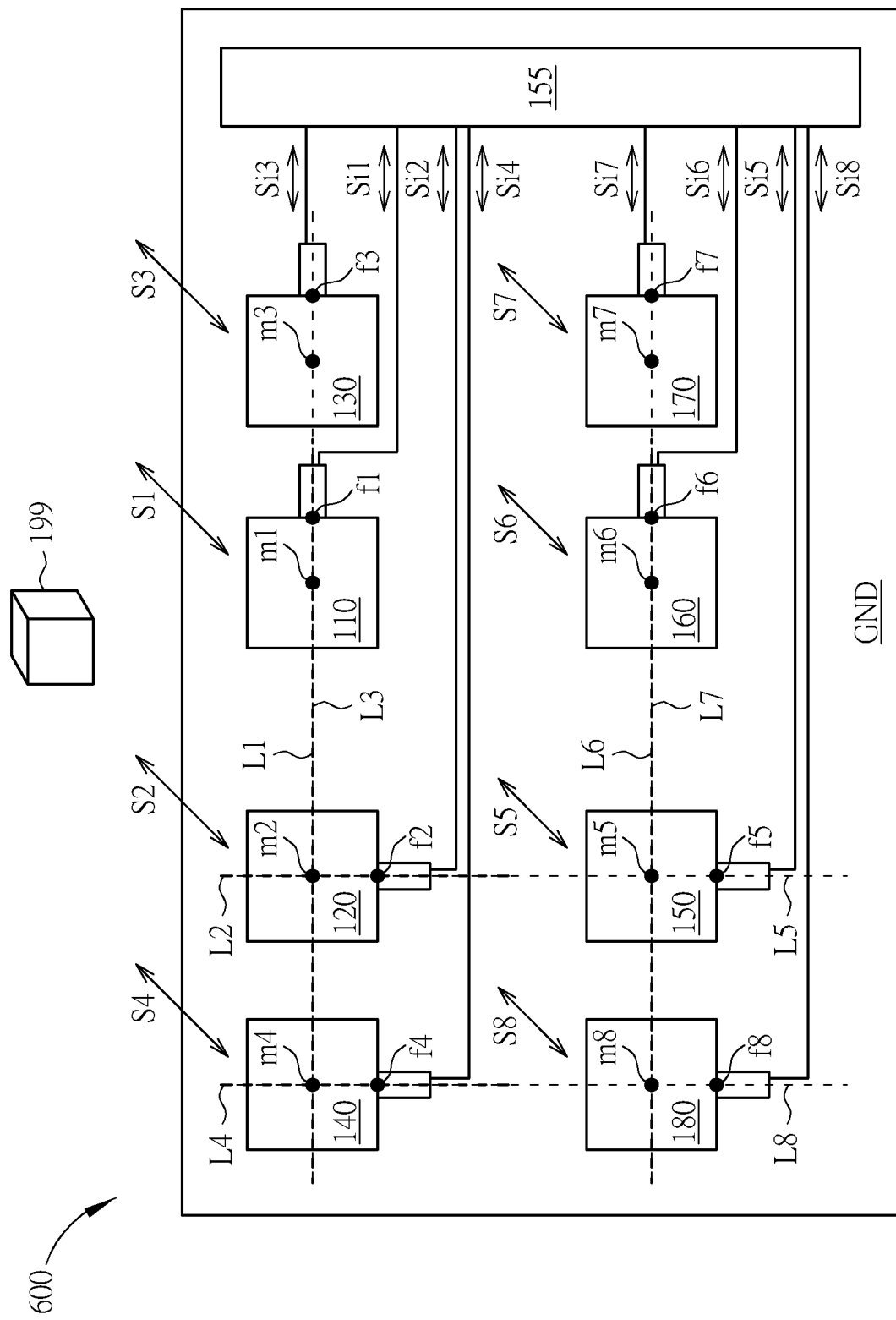
FIG. 6 illustrates a Doppler motion sensor device according to another embodiment.

FIG. 6 illustrates a Doppler motion sensor device 600 according to another embodiment. As shown in FIG. 6, the Doppler motion sensor device 600 may include the first antenna 110 to the sixth antenna 160, a seventh antenna 170 and an eighth antenna 180. The settings of the first antenna 110 to the sixth antenna 160 may be similar to that shown in FIG. 2 to FIG. 5, so they are not repeatedly described. The seventh antenna 170 may be used to transmit or receive a seventh wireless signal S7. The seventh antenna 170 may include a seventh middle point m7 and a seventh feed-in point f7. The seventh middle point m7 may be at a centroid of the seventh antenna 170. The seventh feed-in point f7 may be coupled to the sensor circuit 155 and be used to access a seventh internal signal S17 corresponding to the seventh wireless signal S7. A seventh straight line L7 passing through the seventh middle point m7 and the seventh feed-in point f7 may pass through the sixth middle point m6 and the fifth middle point m5 and be orthogonal to the fifth straight line L5. The eighth antenna 180 may be used to transmit or receive an eighth wireless signal S8. The eighth antenna 180 may include an eighth middle point m8 and an eighth feed-in point f8. The eighth middle point m8 may be at a centroid of the eighth antenna 180. The eighth feed-in point f8 may be coupled to the sensor circuit 155 and be used to access an eighth internal signal Si8 corresponding to the eighth wireless signal S8. An eighth straight line L8 passing through the eighth middle point m8 and the eighth feed-in point f8 may pass through the fourth middle point m4 and be orthogonal to the first straight line L1.

According to embodiments, as shown in FIG. 6, in FIG. 1 to FIG. 6, because of the layout and settings of the antennas 110 to 180, the straight lines L1 and L3 may overlap or be in parallel with one another, the straight lines L6 and L7 may overlap or be in parallel with one another, the straight lines L4 and L8 may overlap or be in parallel with one another, and the straight lines L2 and L5 may overlap or be in parallel with one another.

Regarding the directions of the signals in FIG. 6, according to an embodiment, the first antenna 110 may be used to transmit the first wireless signal S1. The second antenna 120 may be used to receive the second wireless signal S2. The third antenna 130 may be used to transmit the third wireless signal S3. The fourth antenna 140 may be used to receive the fourth wireless signal S4. The fifth antenna 150 may be used to receive the fifth wireless signal S5. The sixth antenna 160 may be used to transmit the sixth wireless signal S6. The seventh antenna 170 may be used to transmit the seventh wireless signal S7. The eighth antenna 180 may be used to receive the eighth wireless signal S8.

According to another embodiment, in FIG. 6, the first antenna 110 may be used to receive the first wireless signal S1. The second antenna 120 may be used to transmit the second wireless signal S2. The third antenna 130 may be used to receive the third wireless signal S3. The fourth antenna 140 may be used to transmit the fourth wireless signal S4. The fifth antenna 150 may be used to transmit the fifth wireless signal S5. The sixth antenna 160 may be used to receive the sixth wireless signal S6. The seventh antenna 170 may be used to receive the seventh wireless signal S7. The eighth antenna 150 may be used to transmit the eighth wireless signal S8.

In FIG. 6, the sensor circuit 155 may be used to analyze the motion of the object 199 by analyzing the internal signals Si1, Si2, Si3, Si4, Si5, Si6, Si7 and Si8. The antennas 110~180 may be used to transmit and receive the corresponding wireless signal S1~S8 simultaneously.

Figure 7:
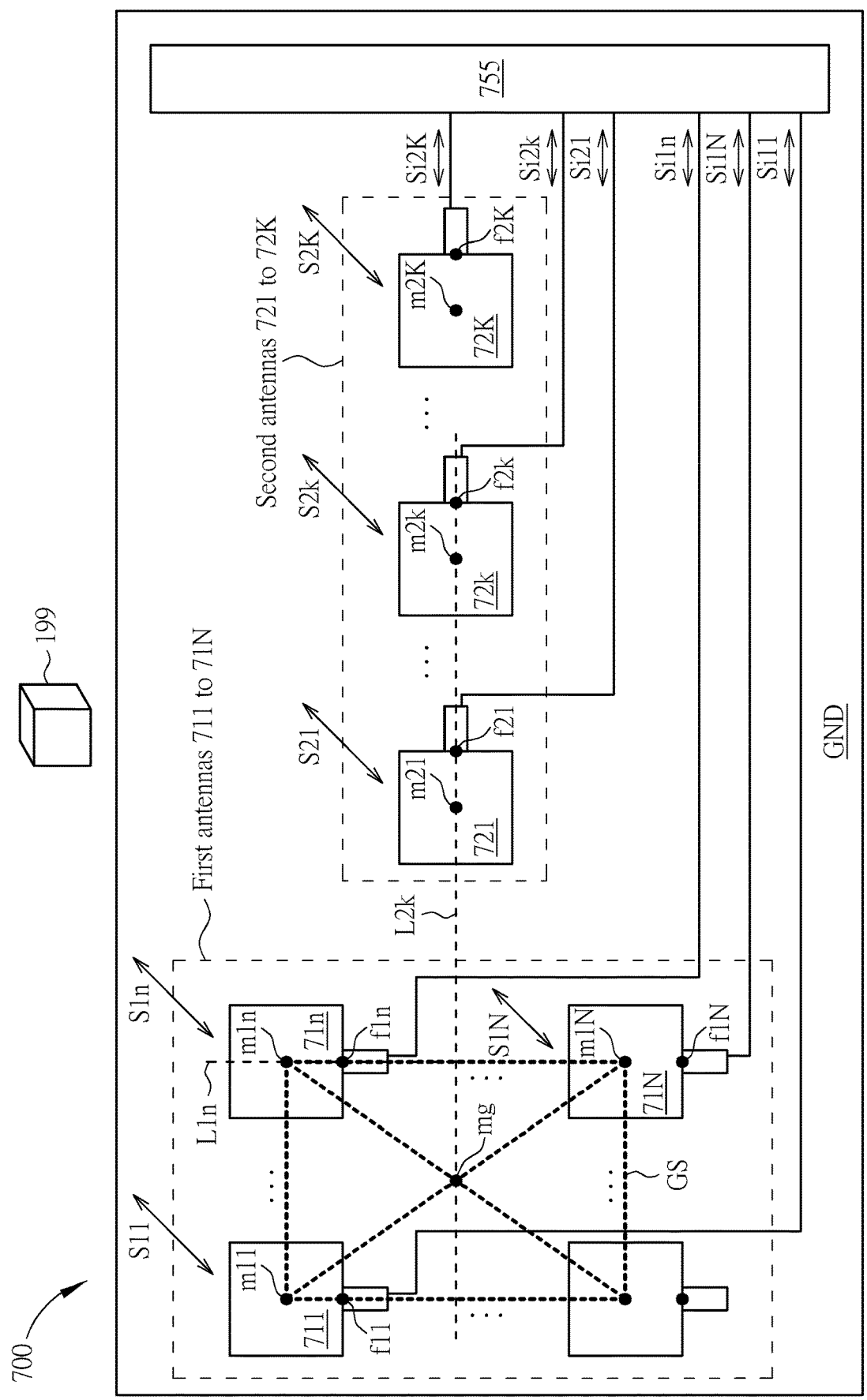
FIG. 7 illustrates a Doppler motion sensor device according to another embodiment.

FIG. 7 illustrates a Doppler motion sensor device 700 according to another embodiment. The Doppler motion sensor device 700 may include N first antennas 711 to 71N and K second antennas 721 to 72K. The N first antennas 711 to 71N may be used to transmit or receive N first wireless signals S11 to S1N. The K second antennas 721 to 72K may be used to transmit or receive K second wireless signals S21 to S2K. The N first antennas and the K second antennas may be used to transmit and receive the corresponding wireless signal simultaneously.

An $n^{th}$ first antenna $71n$ of the N first antennas 711 to 71N may be used to transmit or receive an $n^{th}$ first wireless signal $S1n$. The $n^{th}$ first antenna $71n$ may include an $n^{th}$ first middle point $m1n$ and an $n^{th}$ first feed-in point $f1n$. The $n^{th}$ first middle point $m1n$ may be at a centroid of the $n^{th}$ first antenna $71n$. The $n^{th}$ first feed-in point $f1n$ may be coupled to a sensor circuit 755 for accessing an $n^{th}$ first internal signal $Si1n$ corresponding to the $n^{th}$ first wireless signal $S1n$.

A $k^{th}$ second antenna $72k$ of the K second antennas 721 to 72K may be used transmit or receive a $k^{th}$ second wireless signal $S2k$. The $k^{th}$ second antenna $72k$ may include a $k^{th}$ second middle point $m2k$ and a $k^{th}$ second feed-in point $f2k$. The $k^{th}$ second middle point $m2k$ may be at a centroid of the $k^{th}$ second antenna $72k$. The $k^{th}$ second feed-in point $f2k$ may be coupled to the sensor circuit 755 for accessing a $k^{th}$ second internal signal $Si2k$ corresponding to the $k^{th}$ second wireless signal $S2k$.

An $n^{th}$ first straight line $L1n$ passing through the $n^{th}$ first middle point $m1n$ and the $n^{th}$ first feed-in point $f1n$ may be orthogonal to a $k^{th}$ second straight line $L2k$ passing through the $k^{th}$ second middle point $m2k$ and the $k^{th}$ second feed-in point $f2k$. N first middle points m11 to m1N of the N first antennas 711 to 71N may form a geometric shape GS. The $k^{th}$ second straight line $L2k$ may pass through a centroid mg of the geometric shape GS. The sensor circuit 755 may be used to detect the motion of the object 199 according to the N first internal signals Si11 to Si1N and the K second internal signals Si21 to Si2K. The abovementioned variables N, n, K and k are positive integers, $0 < n \leq N$, and $0 < k \leq K$.

Regarding the directions of the signals in FIG. 7, according to an embodiment, the N first antennas 711 to 71N may be used to receive the N first wireless signals S11 to S1n and transmit the N first internal signals Si11 to Si1N to the sensor circuit 755. The K second antennas 721 to 72K may be used to transmit the K second wireless signals S21 to S2K and receive the K second internal signals Si21 to Si2K from the sensor circuit 755. The K second wireless signals S21 to S2K may be reflected by the surface of the object 199 to form the N first wireless signals S11 to S1N.

According to another embodiment, in FIG. 7, the N first antennas 711 to 71N may be used to transmit the N first wireless signals S11 to S1N and receive the N first internal signals Si11 to Si1N from the sensor circuit 755. The K second antennas 721 to 72K may be used to receive the K second wireless signals S21 to S2K and transmit the K second internal signal Si21 to Si2K to the sensor circuit 755. The N first wireless signals S11 to S1N may be reflected by the surface of the object 199 to form the K second wireless signals S21 to S2K.

Figure 8:
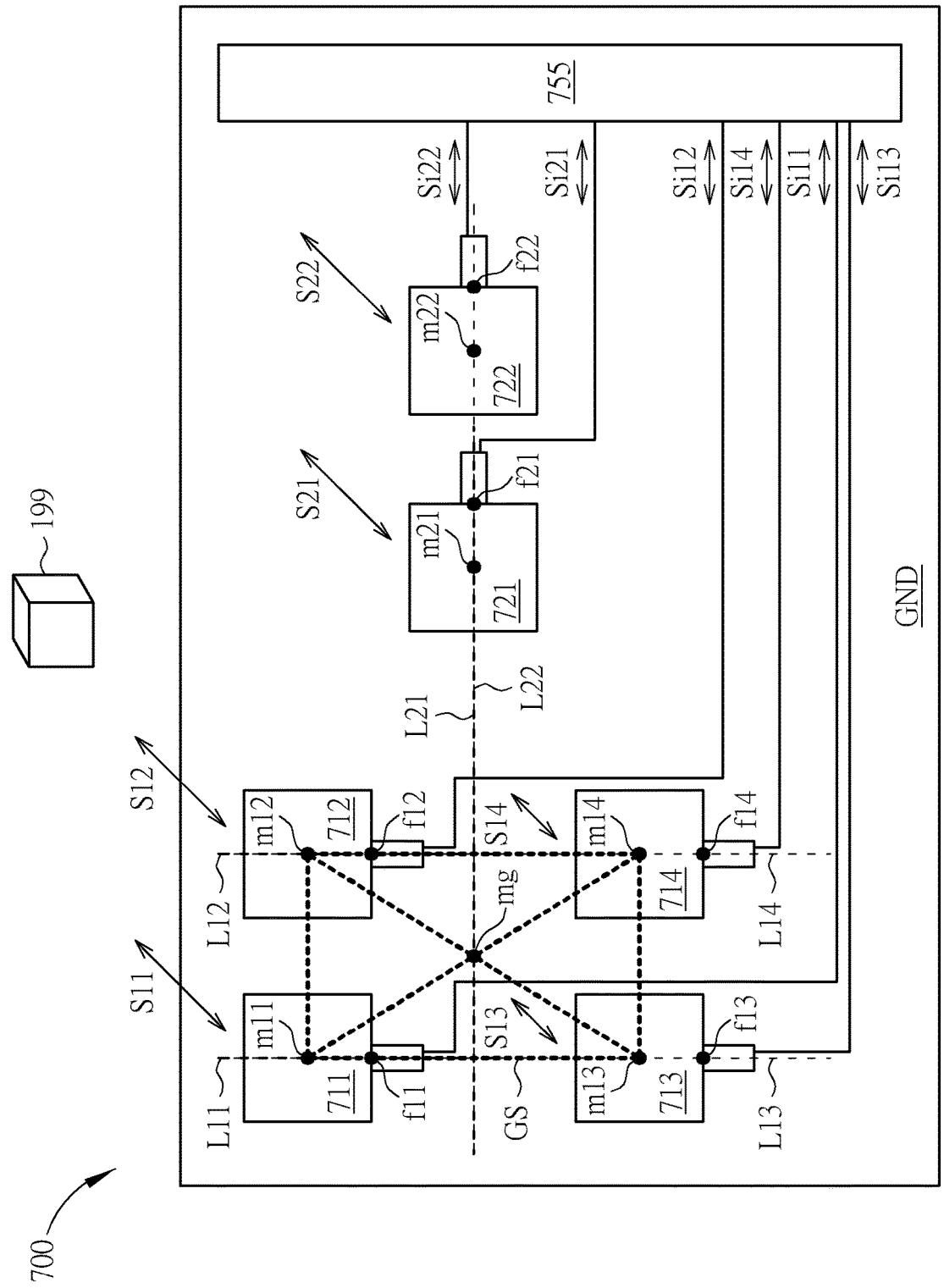
FIG. 8 illustrates the Doppler motion sensor device of FIG. 7 according to an embodiment.

FIG. 8 illustrates the Doppler motion sensor device 700 of FIG. 7 according to an embodiment. FIG. 8 may provide an example where N=4, K=2 and the geometric shape GS may be a rectangular shape.

Figure 9:
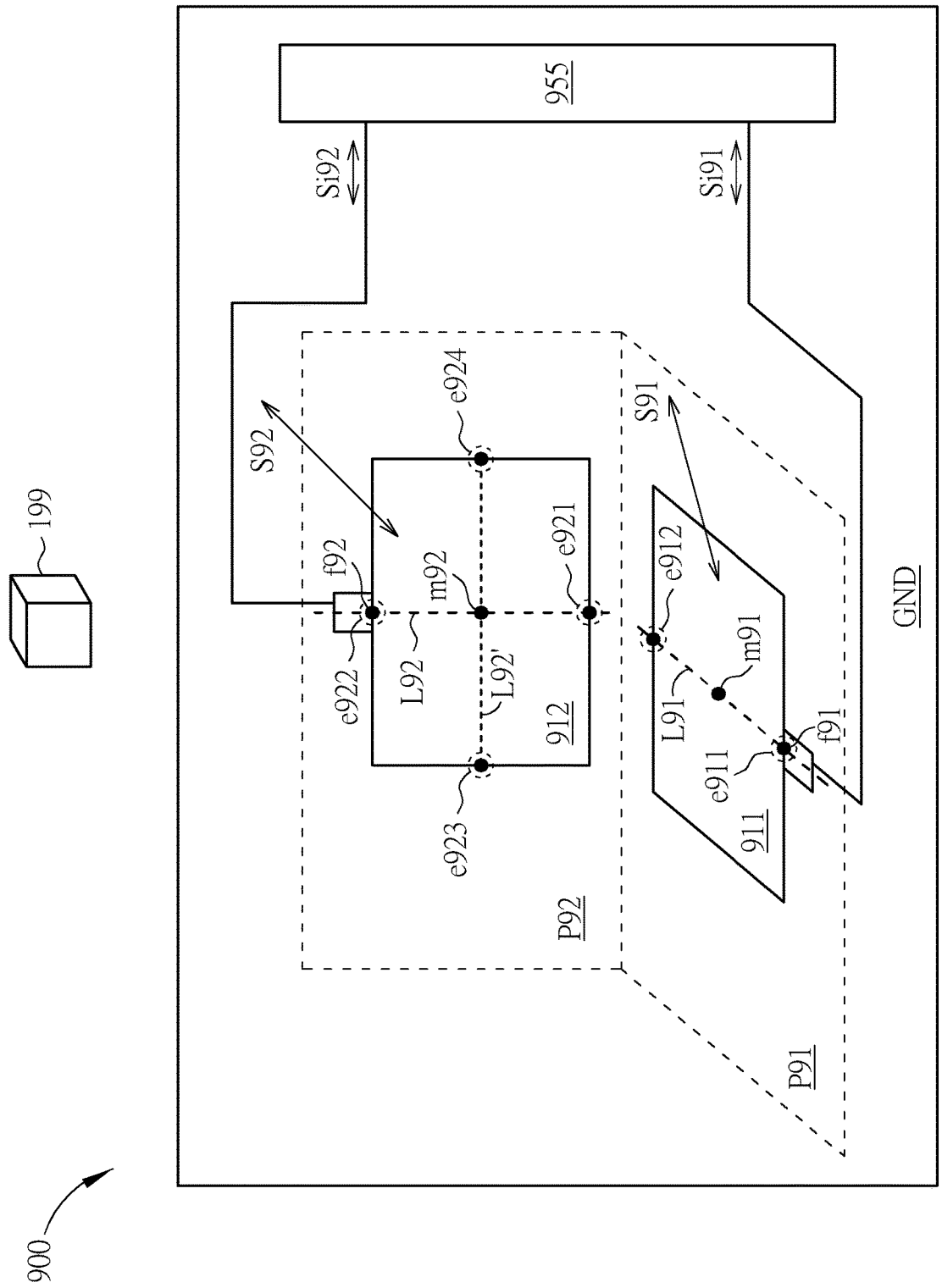
FIG. 9 illustrates a Doppler motion sensor device according to another embodiment.

FIG. 9 illustrates a Doppler motion sensor device 900 according to another embodiment. The Doppler motion sensor device 900 may include a first antenna 911 and a second antenna 912. The first antenna 911 may be used to transmit or receive a first wireless signal S91. The first antenna 911 may include a first middle point m91 and a first feed-in point f91, where the first middle point m91 may be at a centroid of the first antenna 911, and the first feed-in point f91 may be coupled to a sensor circuit 955 for accessing a first internal signal Si91 corresponding to the first wireless signal S91. The second antenna 912 may be used to transmit or receive a second wireless signal S92. The second antenna 912 may include a second middle point m92 and a second feed-in point f92, where the second middle point m92 may be at a centroid of the second antenna 912, and the second feed-in point f91 may be coupled to the sensor circuit 955 for accessing a second internal signal Si92 corresponding to the second wireless signal S92. The antennas 911 and 912 may be used to transmit and receive the corresponding wireless signal S91 and S92 simultaneously.

As shown in FIG. 9, the first antenna 911 may be on a first plane P91. The second antenna 912 may be on a second plane P92. The first plane P91 and the second plane P92 may be orthogonal to one another. One of the first wireless signal S91 and the second wireless signal S92 may be a transmission signal, where the transmission signal may be reflected by the surface of the object 199 to form another one of the first wireless signal S91 and the second wireless signal S92. In other words, regarding the directions of the signals, one of the signals S91 and S92 is a transmission signal, and the other one is a receiving signal. The sensor circuit 955 may be used to detect the motion of the object 199 according to at least the first internal signal S191 and the second internal signal S192. A frequency of the first wireless signal S91 may be similar to a frequency of the second wireless signal S92.

According to an embodiment, as shown in FIG. 9, the first antenna 911 may include a first edge point e911 and a second edge point e912 opposite to the first edge point e911. A first straight line L91 passing through the first edge point e911 and the second edge point e912 of the first antenna 911 may pass through the first middle point m91. The second antenna 912 may include a first edge point e921 and a second edge point e922 opposite to the first edge point e921. A second straight line L92 passing through the first edge point e921 and the second edge point e922 may be orthogonal to the first straight line L91 and normal to the first plane P91, and pass through the second middle point m92. The first feed-in point f91 may be disposed at the first edge point e911 or the second edge point e912 of the first antenna 911. The second feed-in point f92 may be disposed at the first edge point e921 or the second edge point e922 of the second antenna 912.

As shown in FIG. 9, the second antenna 912 may further include a third edge point e923 and a fourth edge point e924 opposite to the third edge point e923. A straight line L92' passing through the third edge point e923 and the fourth edge point e924 may be orthogonal to the second straight line L92. According to another embodiment, when merely the antennas 911 and 912 are regarded, the second feed-in point f92 may be disposed at one of the first edge point e921, the second edge point e922, the third edge point e923 and the fourth edge point e924.

Figure 10:
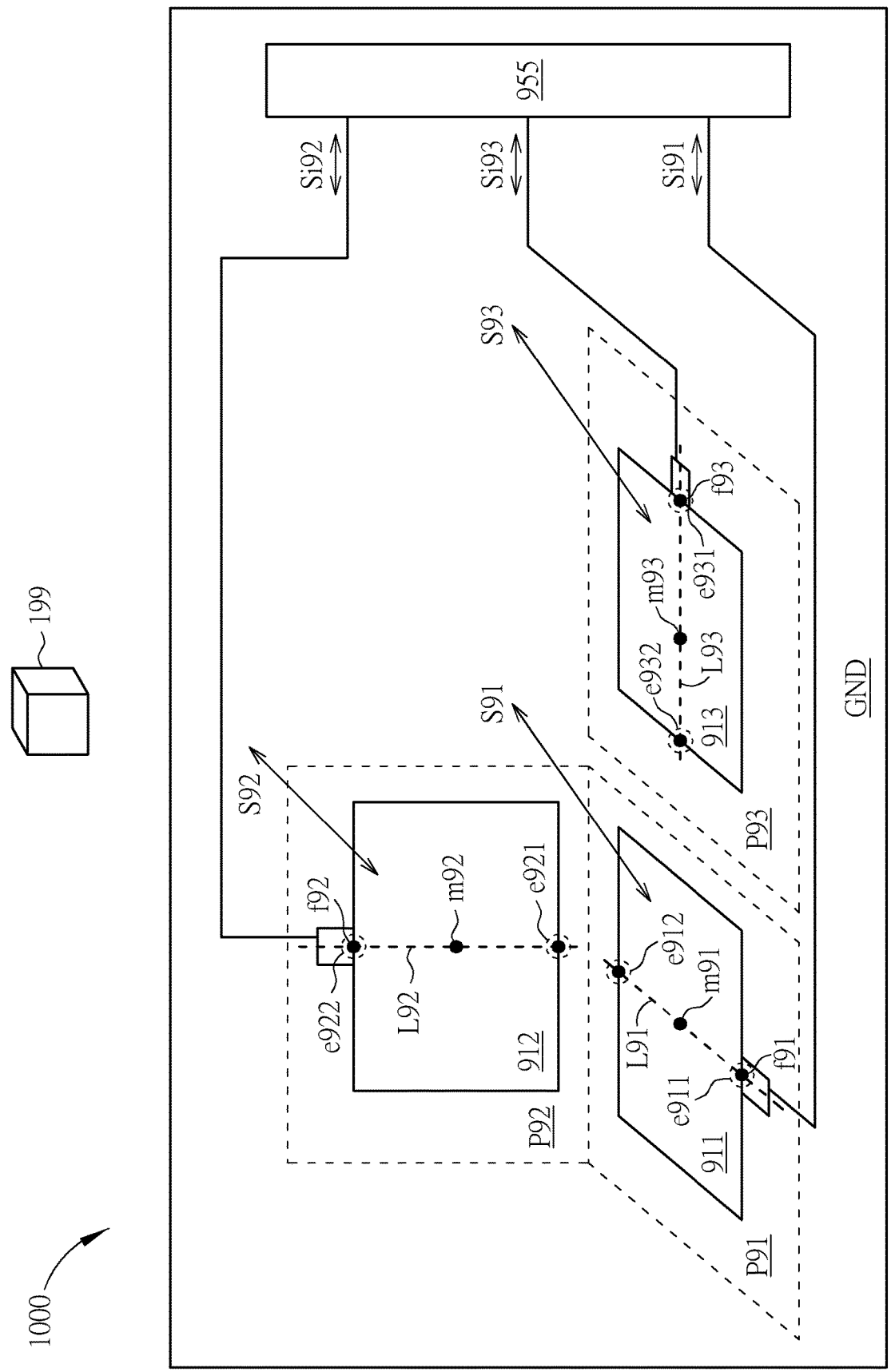
FIG. 10 illustrates a Doppler motion sensor device according to another embodiment.

FIG. 10 illustrates a Doppler motion sensor device 1000 according to another embodiment. The Doppler motion sensor device 1000 may include the first antenna 911 and the second antenna 912 shown in FIG. 9, and further include a third antenna 913. The third antenna 913 may be used to transmit or receive a third wireless signal S93 and include a third middle point m93 and a third feed-in point f93. The third middle point m93 may be at a centroid of the third antenna 913. The third feed-in point f93 may be coupled to the sensor circuit 955 for accessing a third internal signal S193 corresponding to the third wireless signal S93. The third antenna 913 may be on a third plane P93. The third plane P93 may be orthogonal to the second plane P92. The first plane P91 and the third plane P93 may be coplanar or in parallel with one another. The antennas 911~913 may be used to transmit and receive the corresponding wireless signal S91~S93 simultaneously.

According to an embodiment, in FIG. 10, The third antenna 913 may include a first edge point e931 and a second edge point e932 opposite to the first edge point e931. A third straight line L93 passing through the first edge point e931 and the second edge point e932 of the third antenna 913 may be orthogonal to the first straight line L91 and the second straight line L92, and may pass through the third middle point m93. In order to increase the isolation among the three antennas 911, 912, 913, the first feed-in point f91 may be disposed at the first edge point e911 or the second edge point e912 of the first antenna 911. The second feed-in point f92 may be disposed at the first edge point e921 or the second edge point e922 of the second antenna 912. The third feed-in point f93 may be disposed at the first edge point e931 or the second edge point e932 of the third antenna 913.

Figure 11:
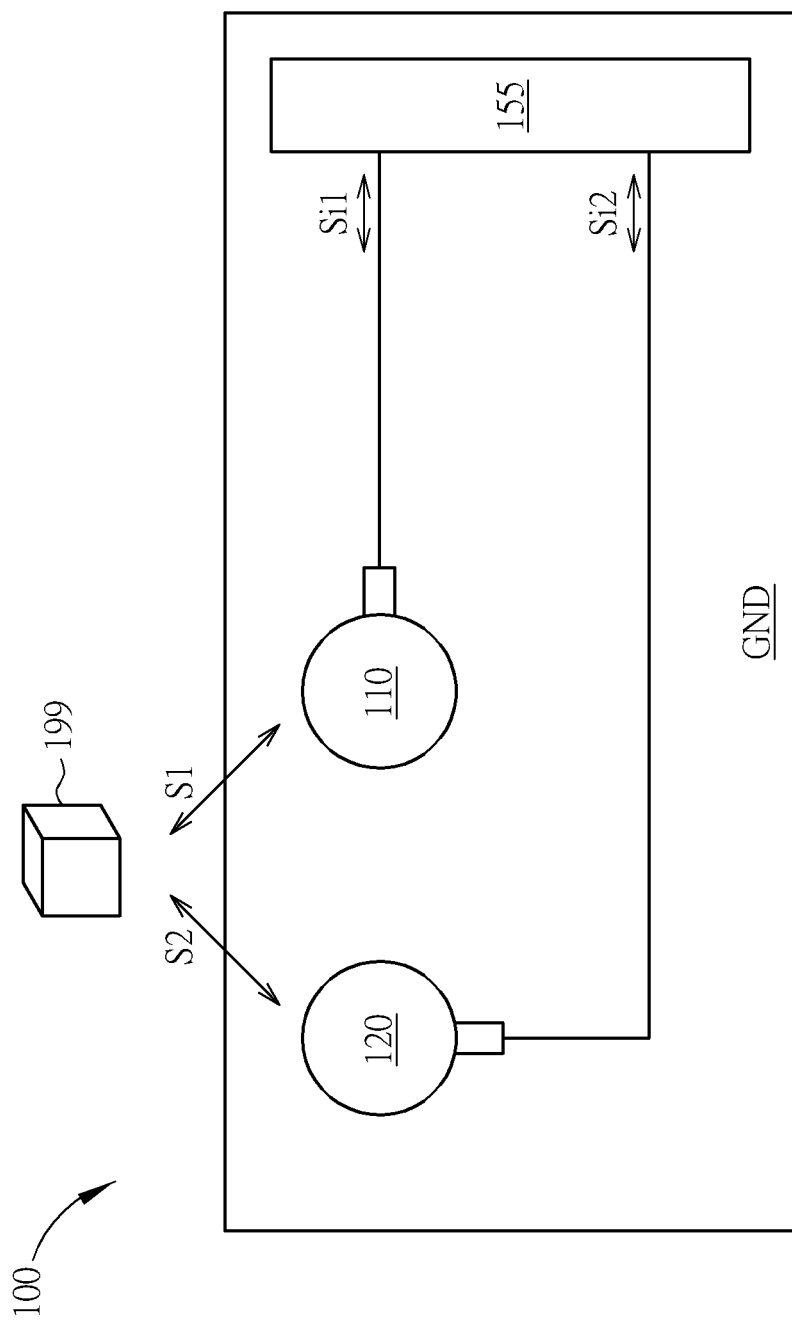
FIG. 11 illustrates that the first antenna and the second antenna have a circular shape according to an embodiment.

According to embodiments, each of the abovementioned antennas 110 to 180 (described in FIG. 1 to FIG. 8), 711 to 71N (described in FIG. 7 to FIG. 8), 721 to 72K (described in FIG. 7 to FIG. 8), 911 to 912 (described in FIG. 9) and 913 (described in FIG. 10) may be of a circular shape, a rectangular shape, an oval shape or a symmetrical shape which has a centroid. FIG. 11 illustrates that the first antenna 110 and the second antenna 120 have a circular shape according to an embodiment. FIG. 11 merely provides an example. In an embodiment, each of the abovementioned antennas of the Doppler motion sensor device could be a planar antenna.

Figure 12:
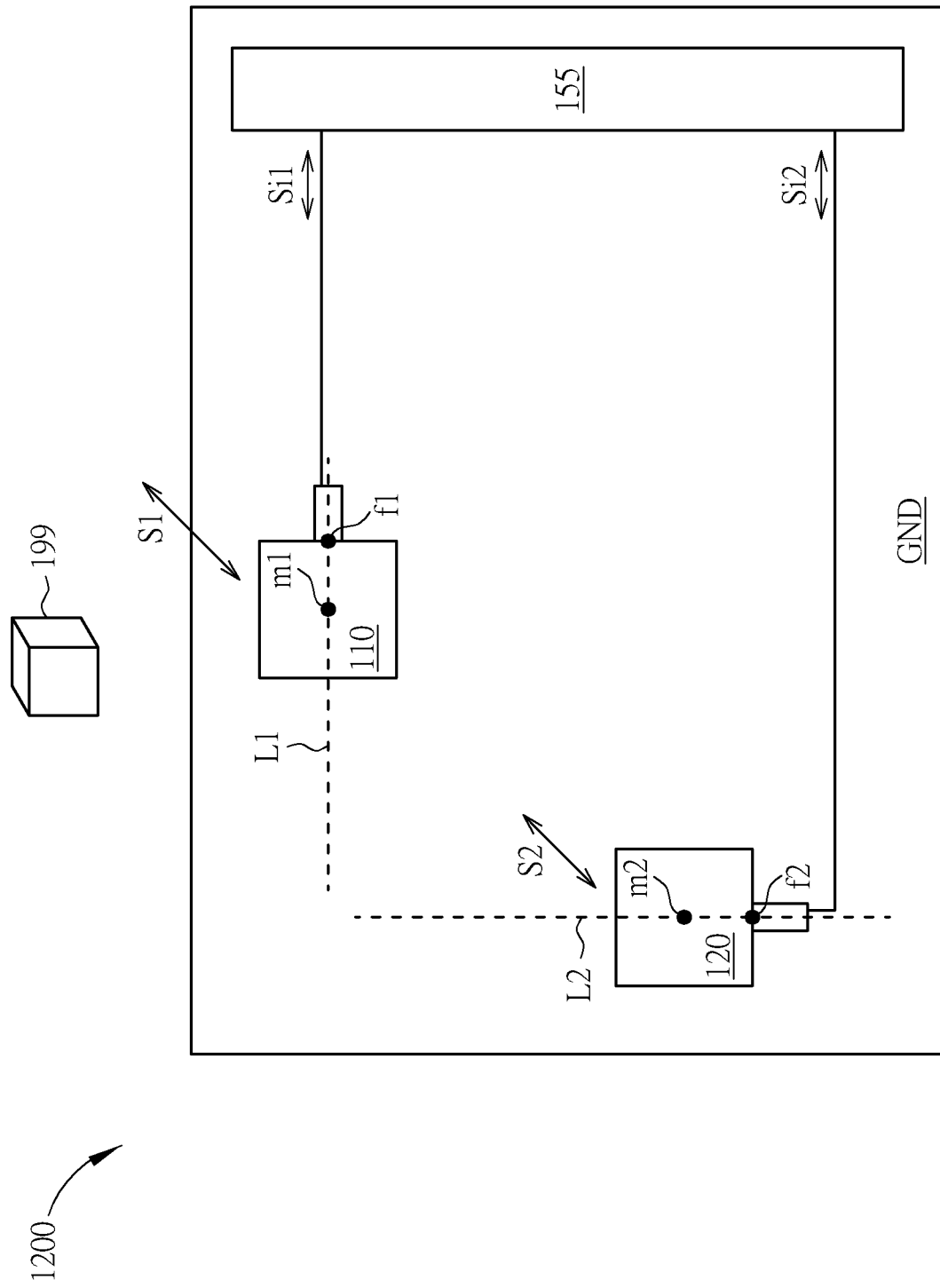
FIG. 12 illustrates a Doppler motion sensor device according to another embodiment.

FIG. 12 illustrates a Doppler motion sensor device 1200 according to another embodiment. The Doppler motion sensor device 1200 may be similar to the Doppler motion sensor device 100 shown in FIG. 1 However, as shown FIG. 1, the first straight line L1 may pass through the second middle point m2 of the second antenna 120, and as shown in FIG. 12, the first straight line L1 may not pass through the second antenna 120. When the first straight line L1 does not pass through the second antenna 120 as shown in FIG. 12, the isolation between the first antenna 110 and the second antenna 120 may be sufficient.

Figure 13:
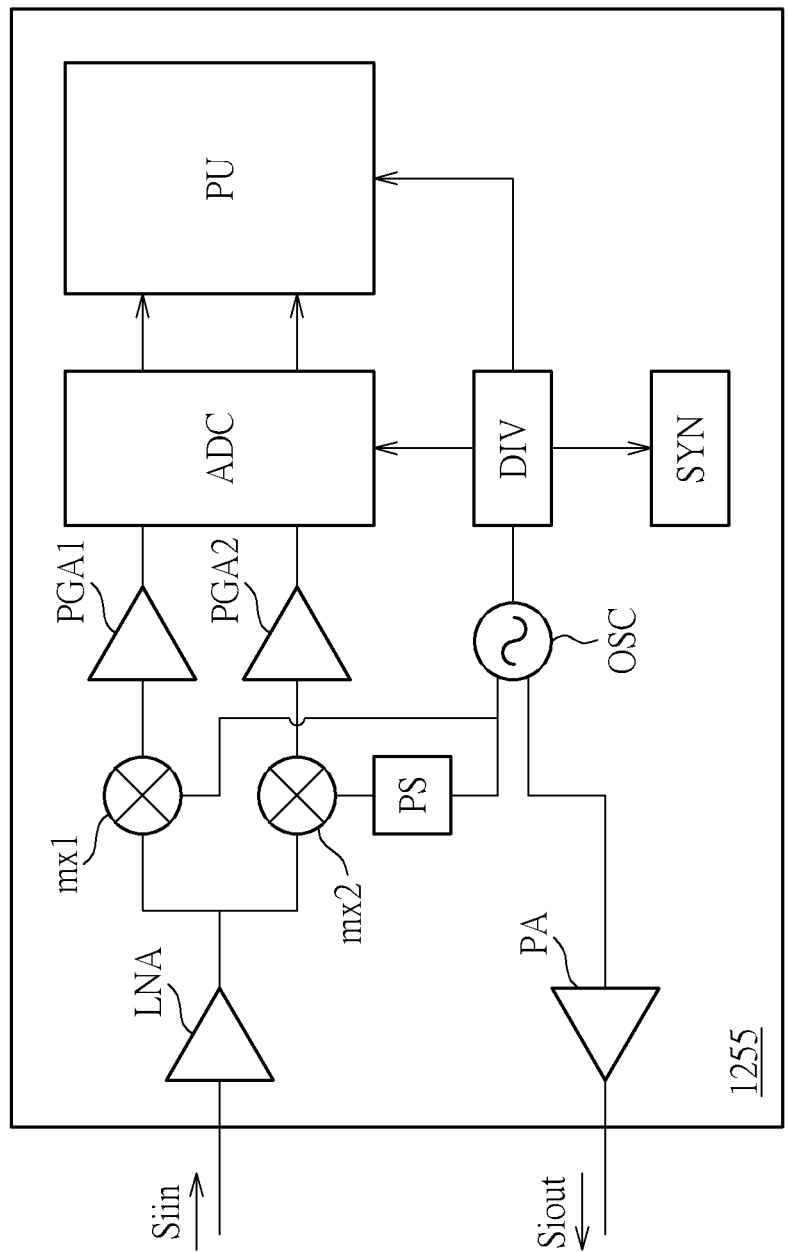
FIG. 13 illustrates a sensor circuit according to an embodiment.

FIG. 13 illustrates a sensor circuit 1255 according to an embodiment. The sensor circuit 1255 may correspond to the sensor circuits 155, 755 and 955 of FIG. 1 to FIG. 12. FIG. 13 may provide a block diagram of the sensor circuit 1255. However, the structure shown in FIG. 13 is merely an example instead of limiting the structure of the sensor circuit of an embodiment. As shown in FIG. 13, the sensor circuit 1255 may include a low noise amplifier LNA, a power amplifier PA, mixers MX1 and MX2, a phase shifter PS, an oscillator OSC, programmable-gain amplifiers PGA1 and PGA2, an analog-to-digital converter ADC, a frequency divider DIV, a synthesizer SYN, and a processing unit PU. An inputted signal Siin may be corresponding to the internal signal(s) inputted to the sensor circuit described above, and an outputted signal Siout may be corresponding to the internal signal(s) outputted from the sensor circuit described above. The couplings of the components of the sensor circuit 1255 may be as shown in FIG. 13. The processing unit PU may receive the outputted signals from the analog-to-digital converter ADC and the frequency divider DIV to detect the motion of the abovementioned object 199 accordingly. According to embodiment, the sensor circuit 1255 may be implemented in an integrated circuit (IC).

According to embodiments, the abovementioned antennas 110 to 180 (described in FIG. 1 to FIG. 8 and FIG. 11 to FIG. 12), 711 to 71N (described in FIG. 7 to FIG. 8), 721 to 72K (described in FIG. 7 to FIG. 8), 911 to 912 (described in FIG. 9) and 913 (described in FIG. 10) may be used in an object sensing device, such as a FMCW (Frequency Modulated Continuous Wave) object sensing device, for detecting the existence of an still object 199 by analyzing the corresponding internal signals with the sensor circuits. In this embodiment, the sensor circuits 155, 755 and 955 of FIG. 1 to FIG. 12 is provided so that the wireless signals S1~8, S11~S1$n$, S21~S2K, and S91~S93 which were transmitted by the corresponding antennas could be Frequency Modulated Continuous Wave, and the frequency of the wireless signals could be changed over time.

As mentioned above, by means of Doppler motion sensor devices provided by embodiments, a plurality of antennas may be disposed close to one another and be coupled to the same common voltage plane, and a sensor circuit may be coupled to the same common voltage plane. High isolation among antennas can be achieved, and unwanted interference caused by the polarizations of the antennas can be avoided. Hence, the problems in the field can be well reduced.

Figure 14A:
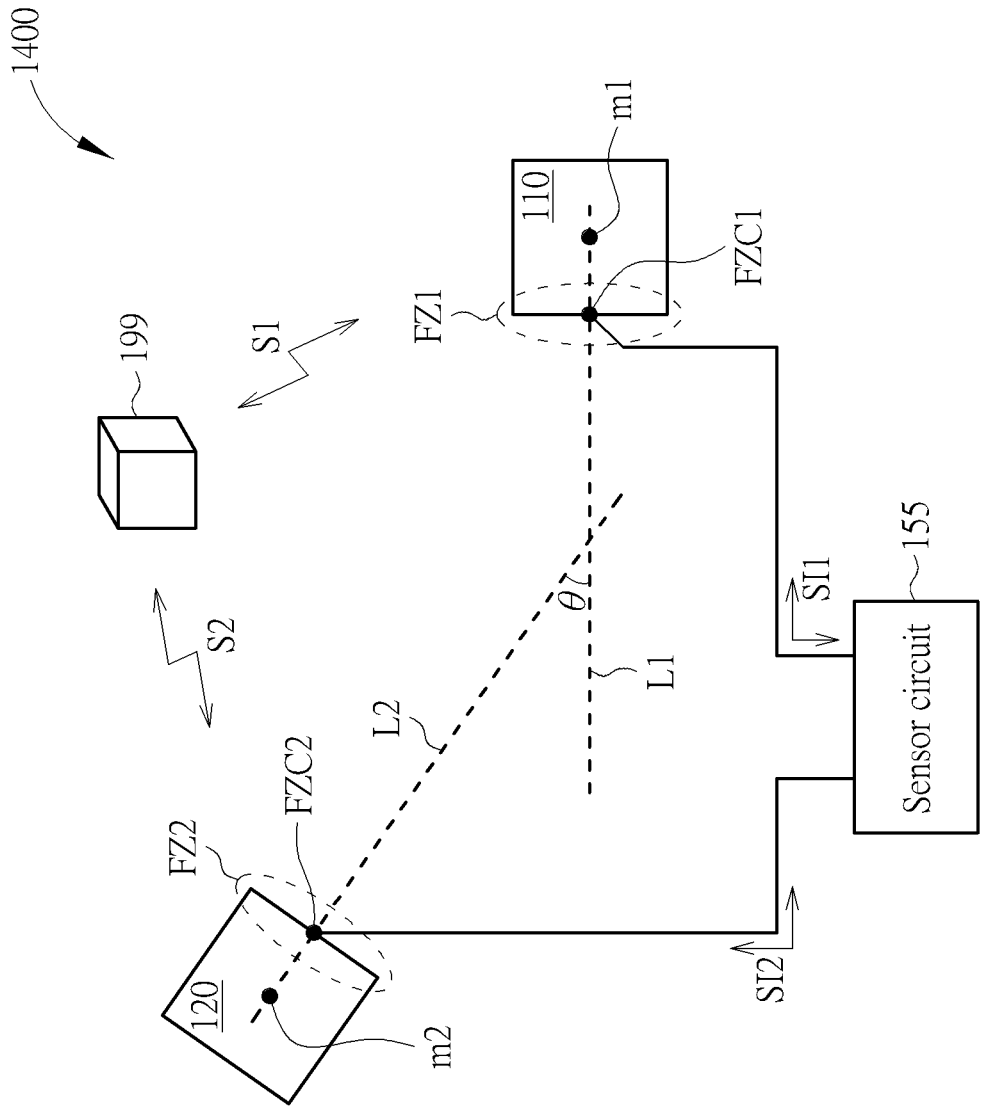
FIG. 14A illustrates a radar device for detecting spatial information of an object according to an embodiment.

FIG. 14A illustrates a radar device 1400 for detecting spatial information of an object 199 according to an embodiment. The radar device 1400 can include a first antenna 110 and a second antenna 120. The first antenna 110 can be used to access a first wireless signal S1 and include a first middle point m1 and a feed zone FZ1. The first middle point m1 is at a centroid of the first antenna 110; and the feed zone FZ1 can have a first zone shape centroid FZC1 and be used to access a first internal signal SI1 corresponding to the first wireless signal S1 between the first antenna 110 and a sensor circuit 155. The second antenna 120 can be used to access a second wireless signal S2 and include a second middle point m2 and another feed zone FZ2. The second middle point m2 can be at a centroid of the second antenna 120, and the another feed zone FZ2 can have a second zone shape centroid FZC2 and be used to access a second internal signal SI2 corresponding to the second wireless signal S2 between the second antenna 120 and the sensor circuit 155. An angle θ, formed between a first straight line L1 and a second straight line L2, is not less than 45 degrees and is not larger than 90 degrees. The first straight line L1 passes through the first zone shape centroid FZC1 and the first middle point m1, and the second straight line L2 passes through the second zone shape centroid FZC2 and the second middle point m2. It can be expressed as 45°≤θ≤90°). One of the first wireless signal S1 and the second wireless signal S2 is reflected by the object 199 to form the other one of the first wireless signal S1 and the second wireless signal S2. The sensor circuit 155 can be used to detect the spatial information of the object 199 according to at least the first internal signal SI1 and the second internal signal SI2.

Figure 14B:
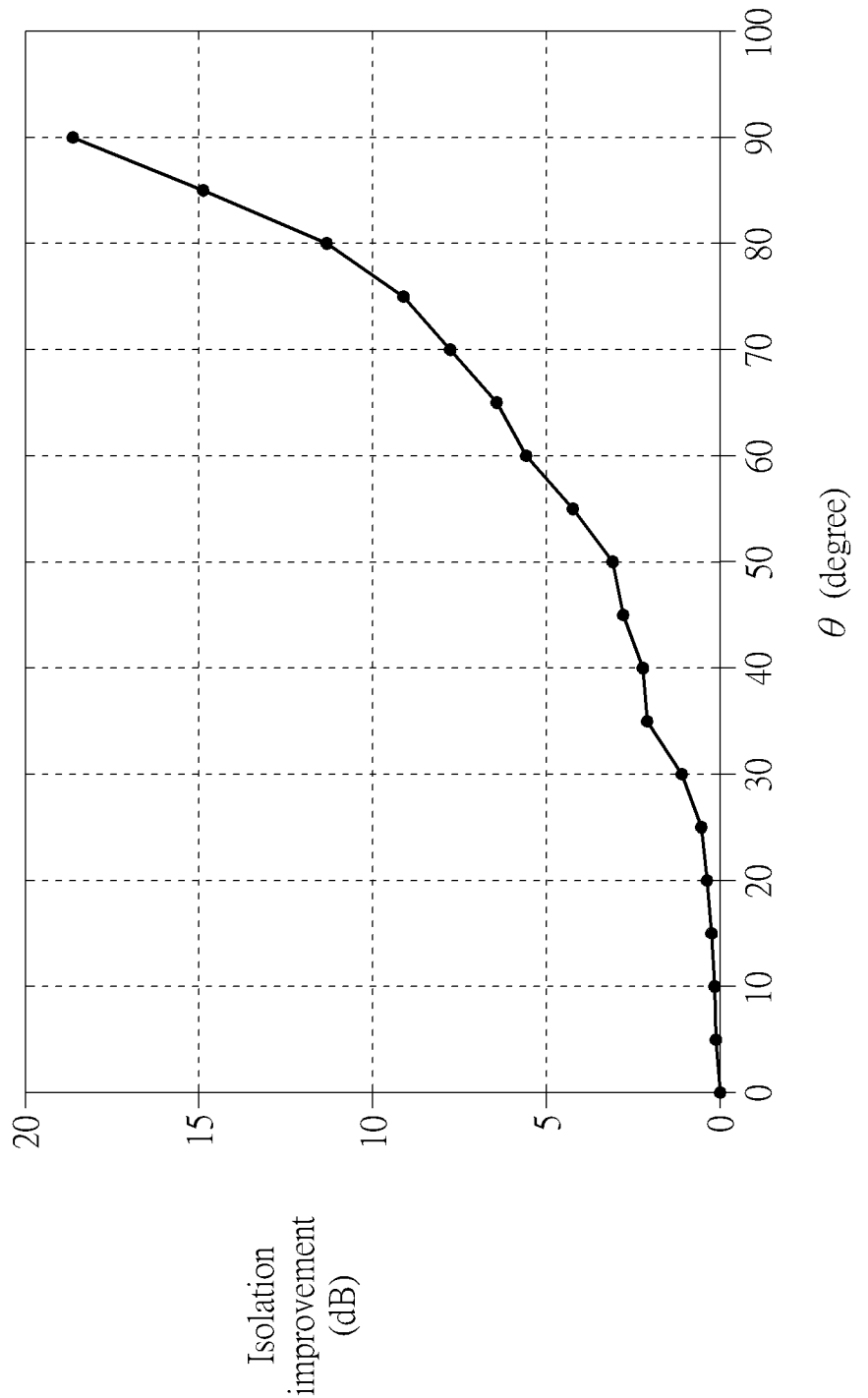
FIG. 14B is a diagram of the angle versus the isolation improvement between the wireless signals transmitted and received by the radar device in FIG. 14A.

FIG. 14B is a diagram of the angle versus the isolation improvement between the wireless signals transmitted and received by the radar device in FIG. 14A. As FIG. 14B, when the angle θ is greater or equal to 45 degrees (i.e. 45≤θ), the isolation improvement may be greater than 3 decibels (dB) and be acceptable. As the angle θ is increased from 45 degrees to 90 degrees, the isolation improvement may be increased by around 16 dB to be about 19 dB, and the signal quality may be further ensured.

According to embodiments, the radar device mentioned in the text can be a Doppler motion sensor device, but embodiments are not limited thereto. The spatial information of the object 199 can be related to a motion of the object 199, and a frequency of the first wireless signal S1 can be similar to a frequency of the second wireless signal S2. For example, a difference of the frequency of the first wireless signal S1 and the frequency of the second wireless signal S2 can be less than 10%.

Figure 15:
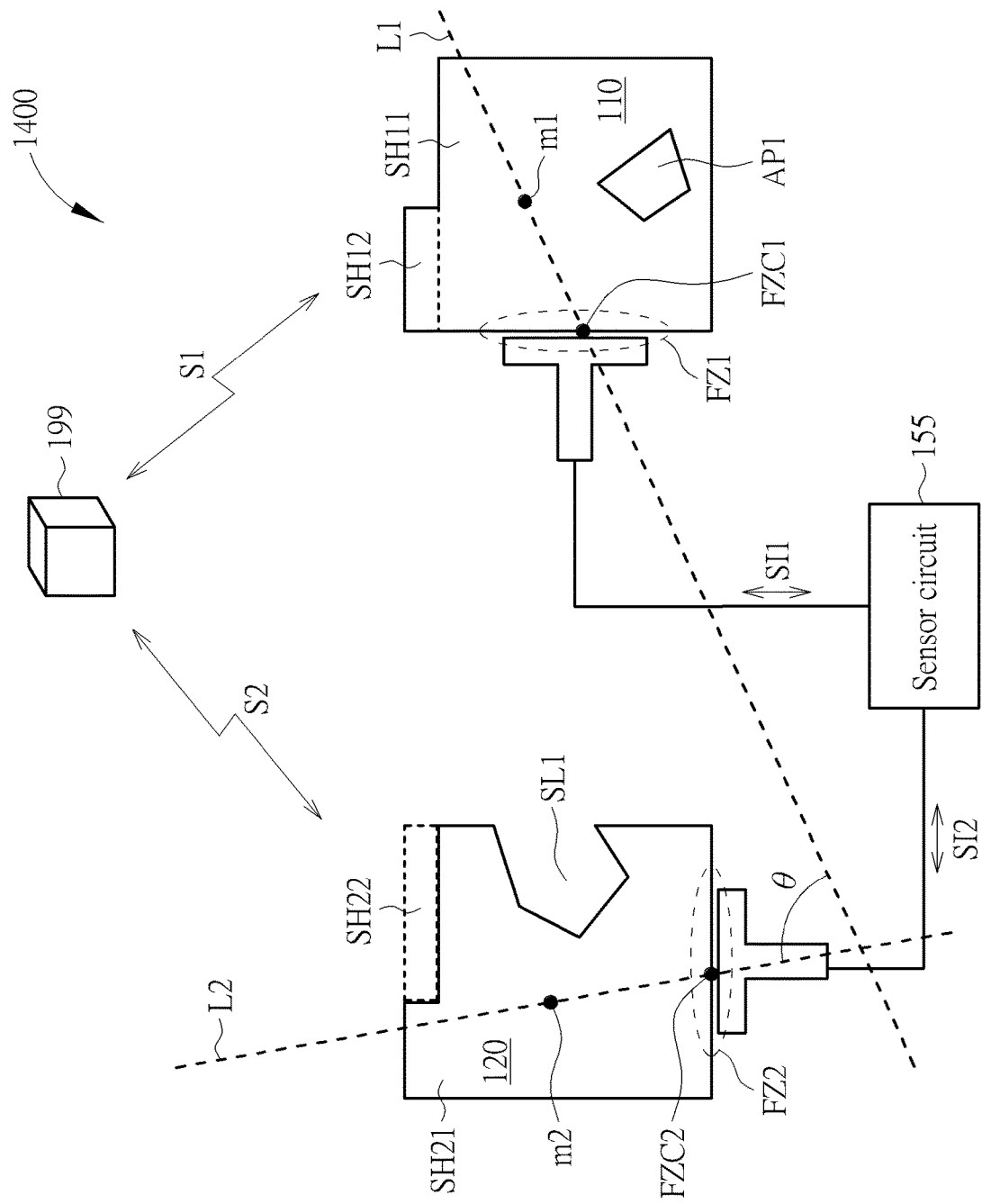
FIG. 15 illustrates a radar device for detecting spatial information of an object according to another embodiment.

FIG. 15 illustrates the radar device 1400 according to an embodiment. As shown in FIG. 15, the first antenna 110 can include a first patch used to access the first wireless signal S1, and the second antenna 120 can include a second patch used to access the second wireless signal S2, where the first patch and the second patch can have different shapes. As shown in FIG. 15, at least one of the first and second patches is formed on a conductive layer. Each of the first patch and the second patch can have an aperture and/or a slot. For example, as shown in FIG. 15, the first patch of the first antenna 110 has an aperture AP1, and the second patch of the second antenna 120 has a slot SL1. As for the first patch and the second patch, a smaller piece can be added to or removed from a large piece. For example, as shown in FIG. 15, the first patch of the first antenna 110 can have a smaller piece SH12 added to a larger piece SH11. The second patch of the second antenna 120 can have a smaller piece SH22 removed from a larger piece SH21.

Figure 16:
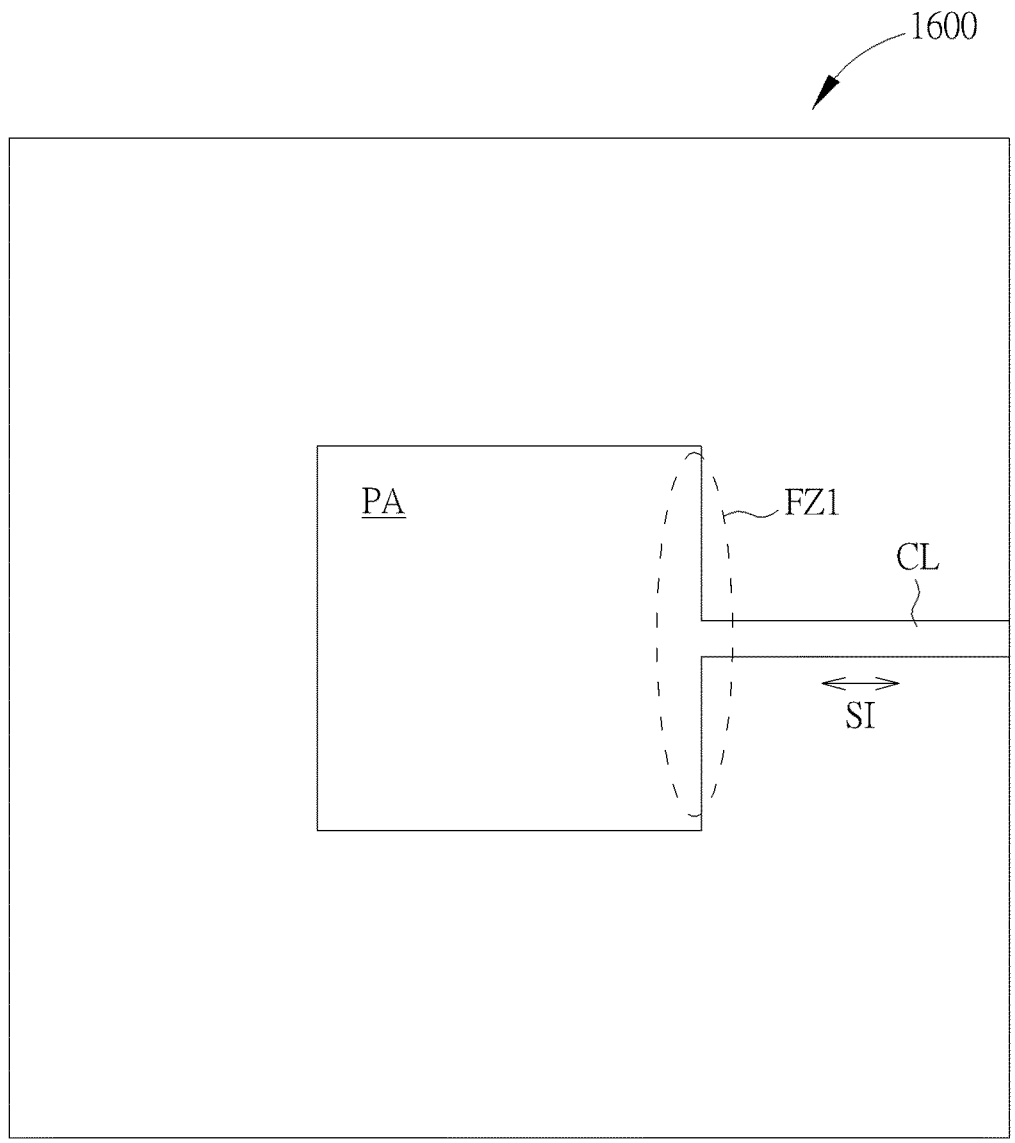
FIG. 16 to FIG. 38 illustrate antennas according to embodiments.
Figure 17:
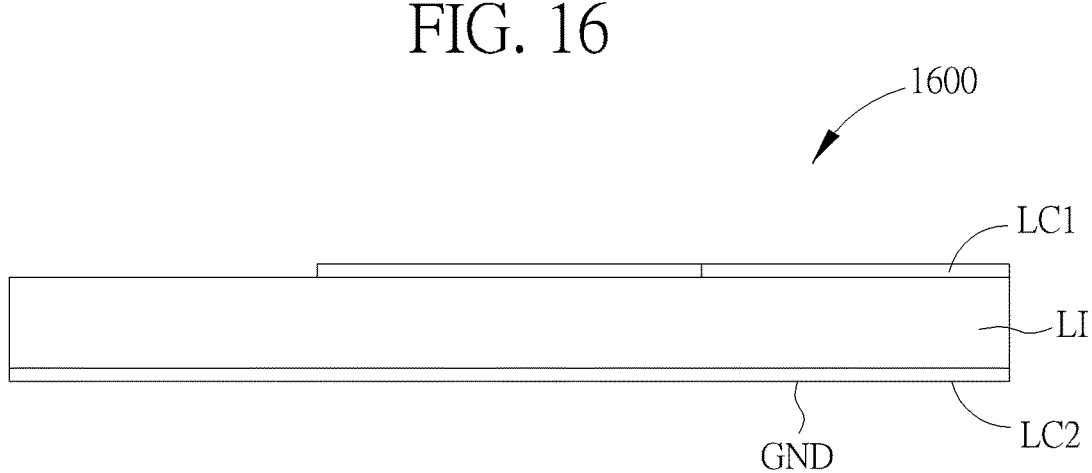

The first antenna 110 and the second antenna 120 are not limited to the structures shown in FIG. 14A and FIG. 15. FIG. 16 and FIG. 17 respectively illustrate a top view and a side view of an antenna 1600 according to an embodiment. The antenna 1600 can be one of the first antenna 110 and the second antenna 120 shown in FIG. 14A. As shown in FIG. 16 and FIG. 17, the antenna 1600 can include a patch PA, a conductive line CL, a ground GND and an insulation layer LI. The patch PA can be formed on a first conductive layer LC1. The conductive line CL can be formed on the first conductive layer LC1, coupled between the patch PA and the sensor circuit 155, and used to access an internal signal SI, where the internal signal SI can be the first internal signal SI1 or the second internal signal SI2. The ground GND can be formed on a second conductive layer LC2. The insulation layer LI can be formed between the first conductive layer LC1 and the second conductive layer LC2.

Figure 18:
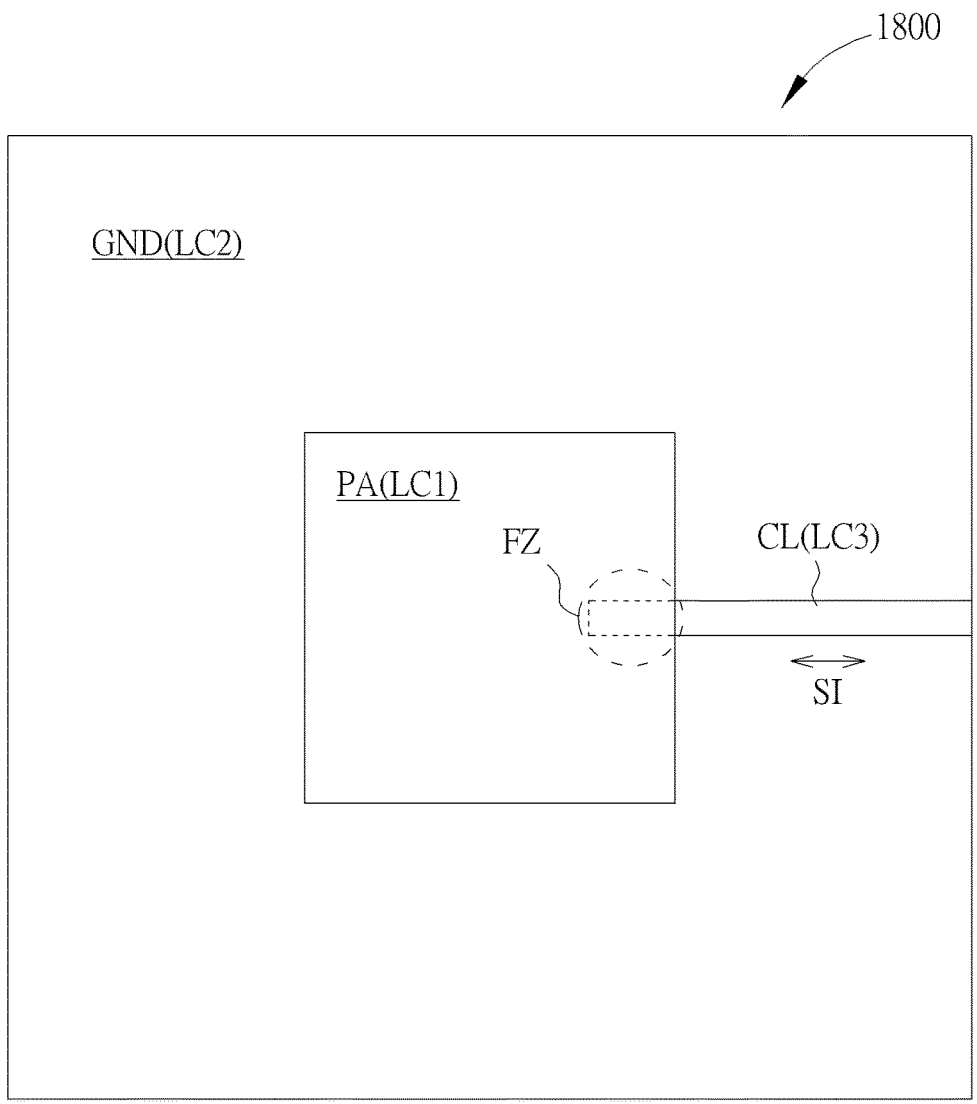
Figure 19:
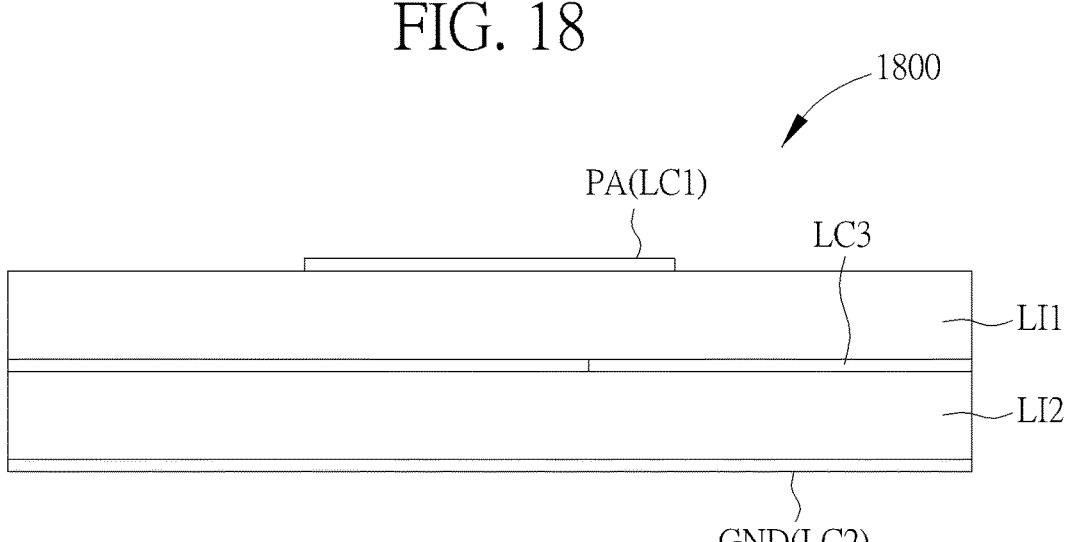

FIG. 18 and FIG. 19 respectively illustrate a top view and a side view of an antenna 1800 according to an embodiment. The antenna 1800 can be one of the first antenna 110 and the second antenna 120 shown in FIG. 14A. As shown in FIG. 18 and FIG. 19, the antenna 1800 can include a patch PA, a ground GND, a conductive line CL, a first insulation layer LI1 and a second insulation layer LI2. The patch PA can be formed on a first conductive layer LC1. The ground GND can be formed on a second conductive layer LC2. The conductive line CL can be formed on a third conductive layer LC3, disposed to overlap the feed zone FZ related to the patch PA, and used to access an internal signal SI, where the internal signal SI can be the first internal signal SI1 or the second internal signal SI2. The first insulation layer LI1 can be formed between the first conductive layer LC1 and the third conductive layer LC3. The second insulation layer LI2 can be formed between the second conductive layer LC2 and the third conductive layer LC3. The third conductive layer LC3 can be formed between the first conductive layer LC1 and the second conductive layer LC2.

Figure 20:
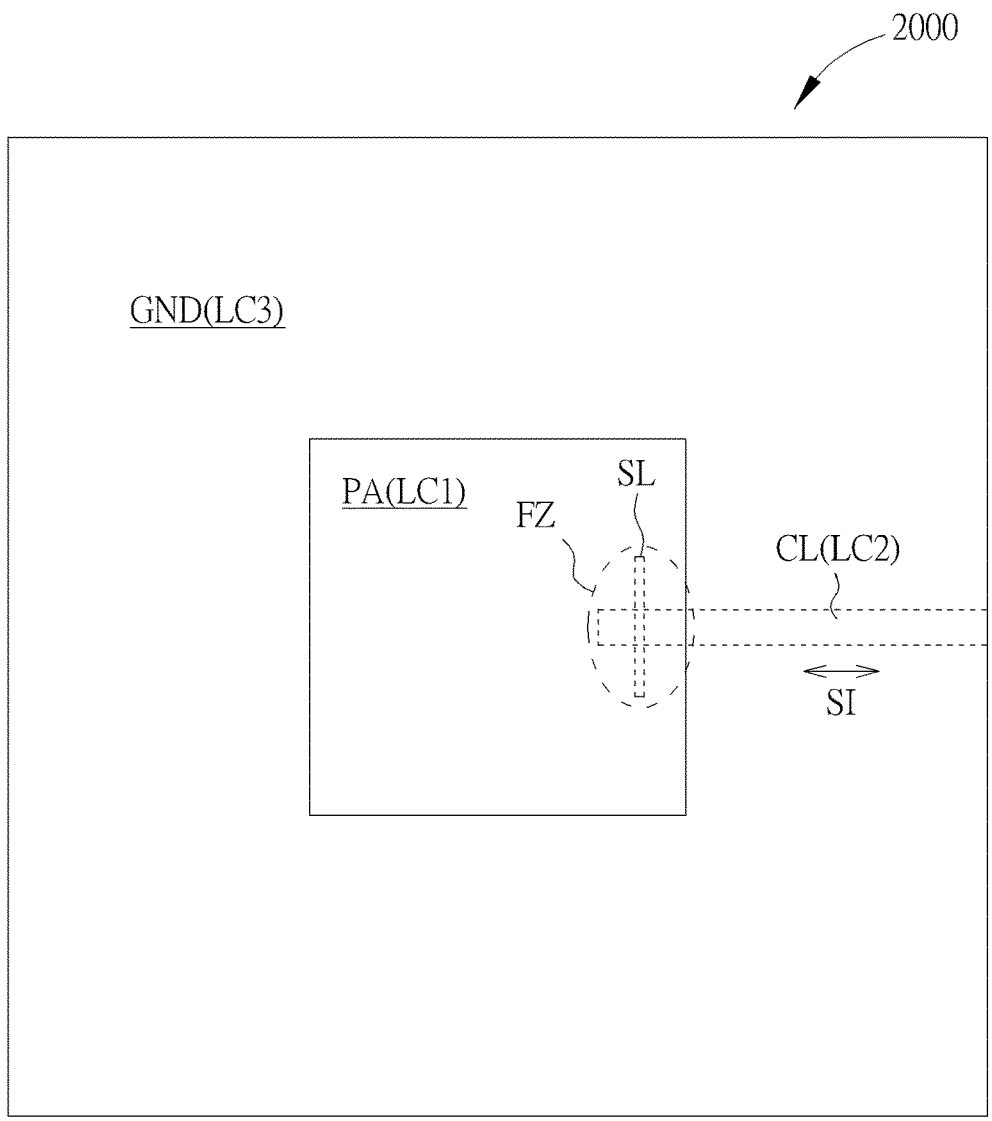
Figure 21:
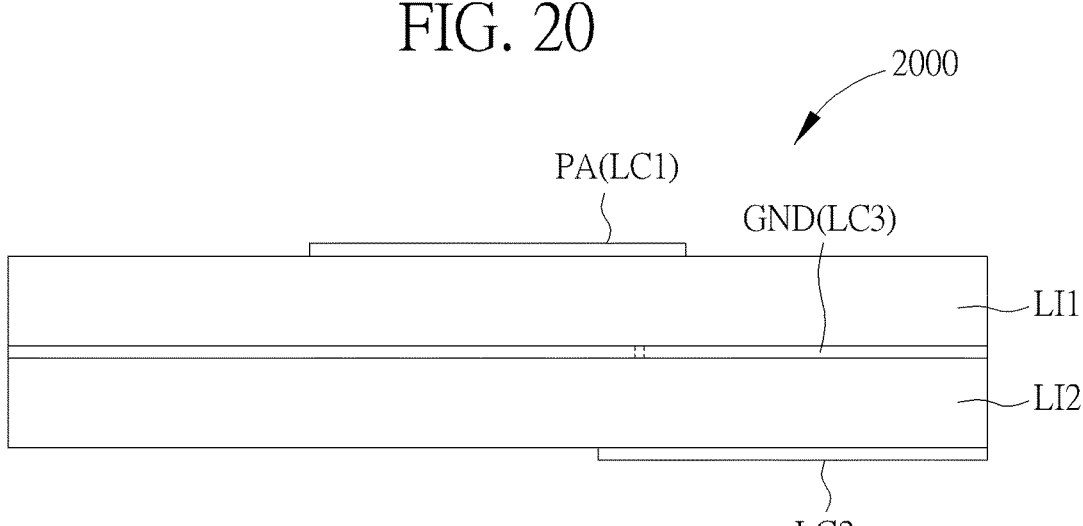

FIG. 20 and FIG. 21 respectively illustrate a top view and a side view of an antenna 2000 according to another embodiment. The antenna 2000 can be one of the first antenna 110 and the second antenna 120 shown in FIG. 14A. As shown in FIG. 20 and FIG. 21, the antenna 2000 can include a patch PA, a conductive line CL, a ground GND, a slot SL, a first insulation layer LI1 and a second insulation layer LI2. The patch PA can be formed on a first conductive layer LC1. The conductive line CL can be formed on a second conductive layer LC2, disposed to overlap the feed zone FZ related to the patch PA, and used to access an internal signal SI, where the internal signal SI can be the first internal signal SI1 or the second internal signal SI2. The ground GND can be formed on a third conductive layer LC3. The slot SL can be generated on the third conductive layer LC3 and located between the conductive line CL and the patch PA. The first insulation layer LI1 can be formed between the first conductive layer LC1 and the third conductive layer LC3. The second insulation layer LI2 can be formed between the third conductive layer LC3 and the second conductive layer LC2. The third conductive layer LC3 can be between the first conductive layer LC1 and the second conductive layer LC2.

FIG. 20 is an example instead of limiting the scope of embodiments; according to embodiments, the slot SL shown in FIG. 20 can have a rectangular shape, an H shape, a circular shape, an oval shape or an irregular shape, and the feed zone FZ related to the patch PA can be located near a side of the patch PA, a center of the patch PA or a corner of the patch PA.

Figure 22:
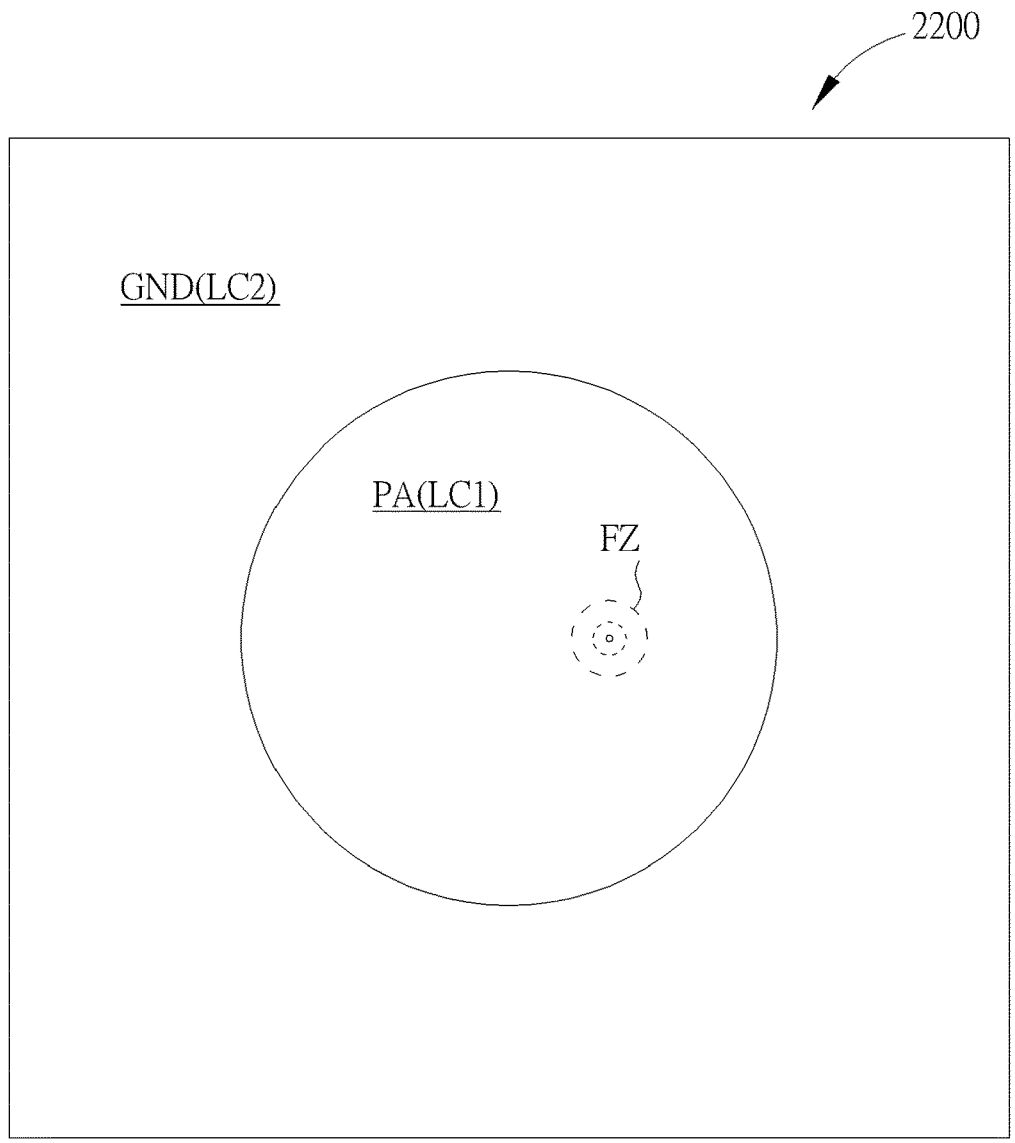
Figure 23:
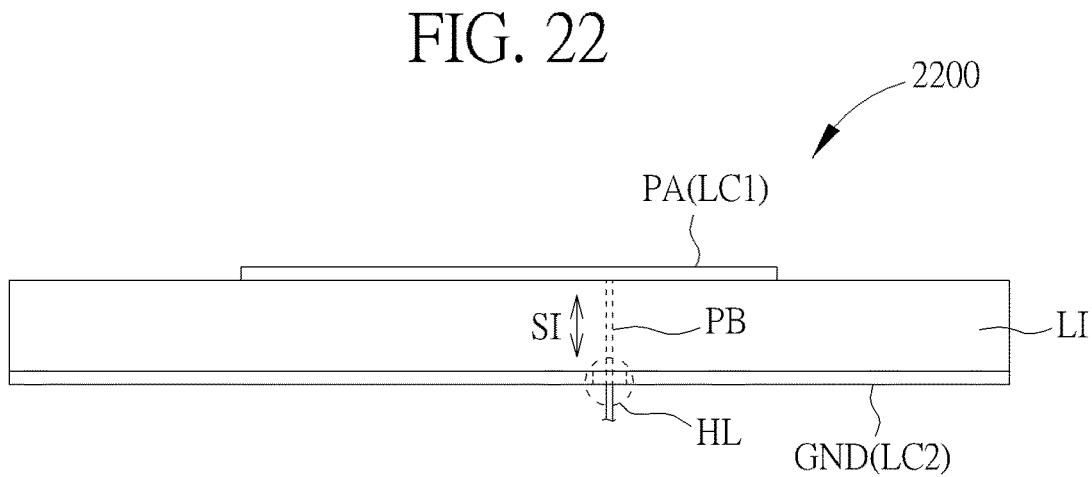

FIG. 22 and FIG. 23 respectively illustrate a top view and a side view of an antenna 2200 according to another embodiment. The antenna 2200 can be one of the first antenna 110 and the second antenna 120 shown in FIG. 14A. As shown in FIG. 22 and FIG. 23, the antenna 2200 can include a patch PA, a ground GND, a hole HL, a probe PB and an insulation layer LI. The patch PA can be formed on a first conductive layer LC1. The ground GND can be formed on a second conductive layer LC2. The hole HL can be generated on the second conductive layer LC2 and disposed to overlap the feed zone FZ related to the patch PA. The probe PB can be disposed through the hole HL. The probe PB can include a first terminal coupled to the patch PA and a second terminal, and be used to access an internal signal SI. The internal signal SI can be the first internal signal SI1 or the second internal signal SI2. The insulation layer LI can be formed between the first conductive layer LC1 and the second conductive layer LC2.

Figure 24:
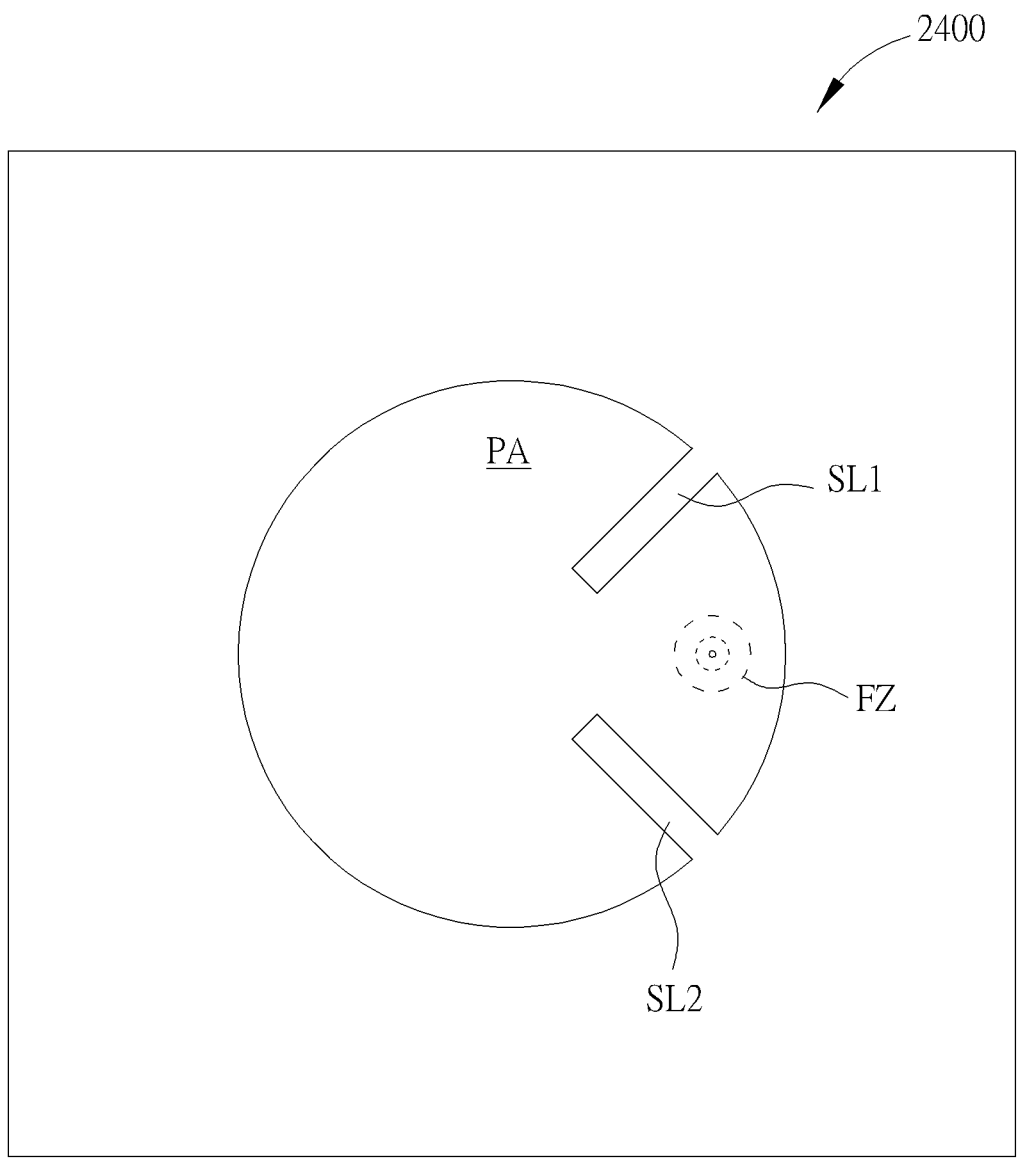

FIG. 24 illustrates an antenna 2400 according to another embodiment. The antenna 2400 can be one of the first antenna 110 and the second antenna 120 shown in FIG. 14A. The antenna 2400 can be similar to the antenna 2200 and further include a first slot SL1 and a second slot SL2. The first slot SL1 can be formed on the patch PA and disposed to cut off a first part of an edge of the patch PA. The second slot SL2 can be formed on the patch PA and disposed to cut off a second part of the edge of the patch PA. The feed zone FZ related to the patch PA can be located between the first slot SL1 and the second slot SL2.

Figure 25:
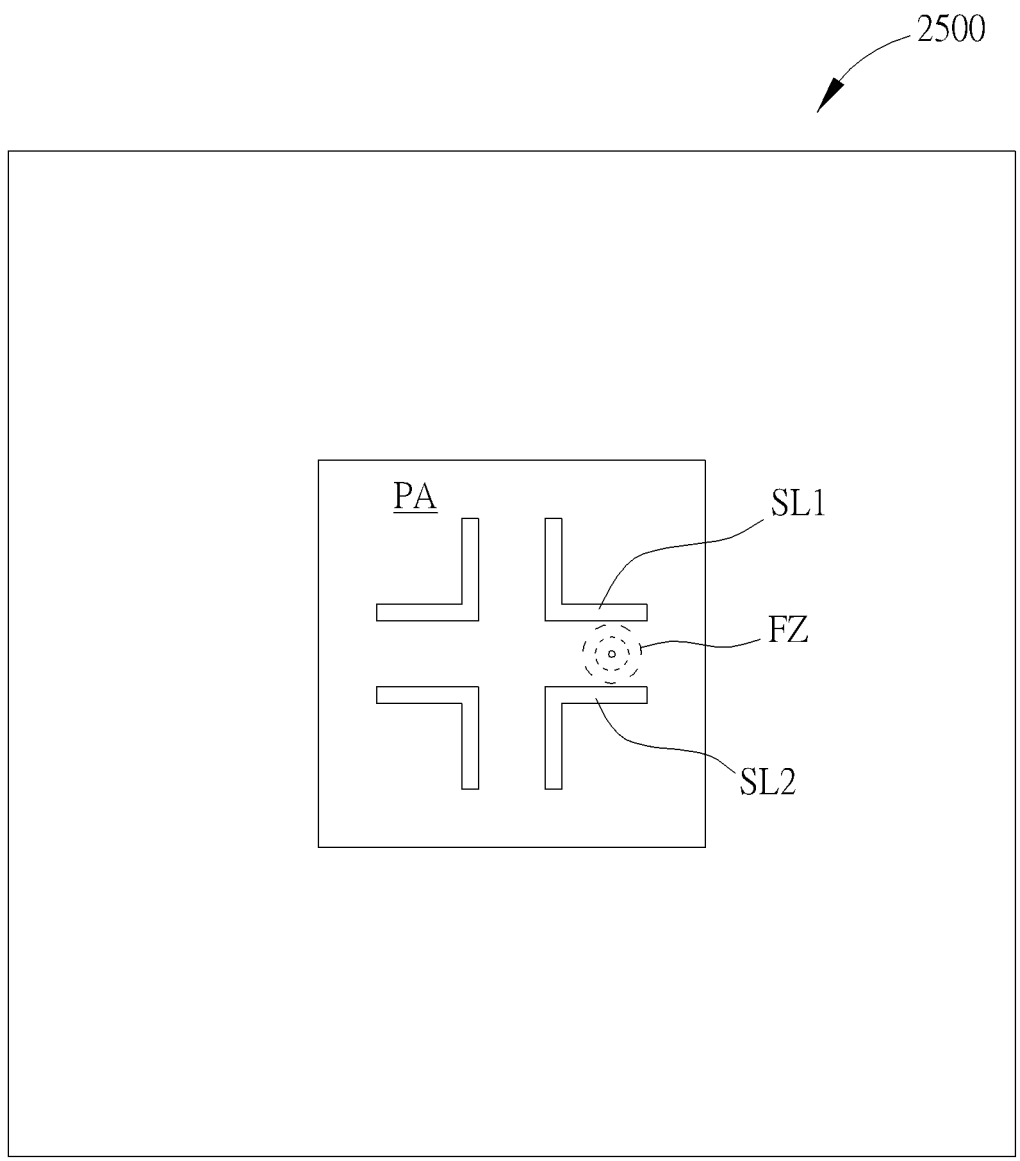

FIG. 25 illustrates an antenna 2500 according to another embodiment. The antenna 2500 can be one of the first antenna 110 and the second antenna 120 shown in FIG. 14A. The antenna 2500 can be similar to the antenna 2200 and further include a first slot SL1 and a second slot SL2. The first slot SL1 and the second slot SL2 can be formed on the patch PA. The first slot SL1 and the second slot SL2 can have a substantially same shape, and the feed zone FZ related to the patch PA can be between the first slot SL1 and the second slot SL2.

As shown in FIG. 25, each of the first slot SL1 and the second slot SL2 can have an L shape so as to have a first part, a second part and a turning point joining the first part and the second part. The patch PA can have a rectangular shape with four sides, and the first part of each of the first slot SL1 and the second slot SL2 can be substantially parallel to one of the sides of the patch PA. FIG. 25 is merely an example, and the locations of the slots can be adjusted as long as the performance of the antenna 2500 is acceptable.

Figure 26:
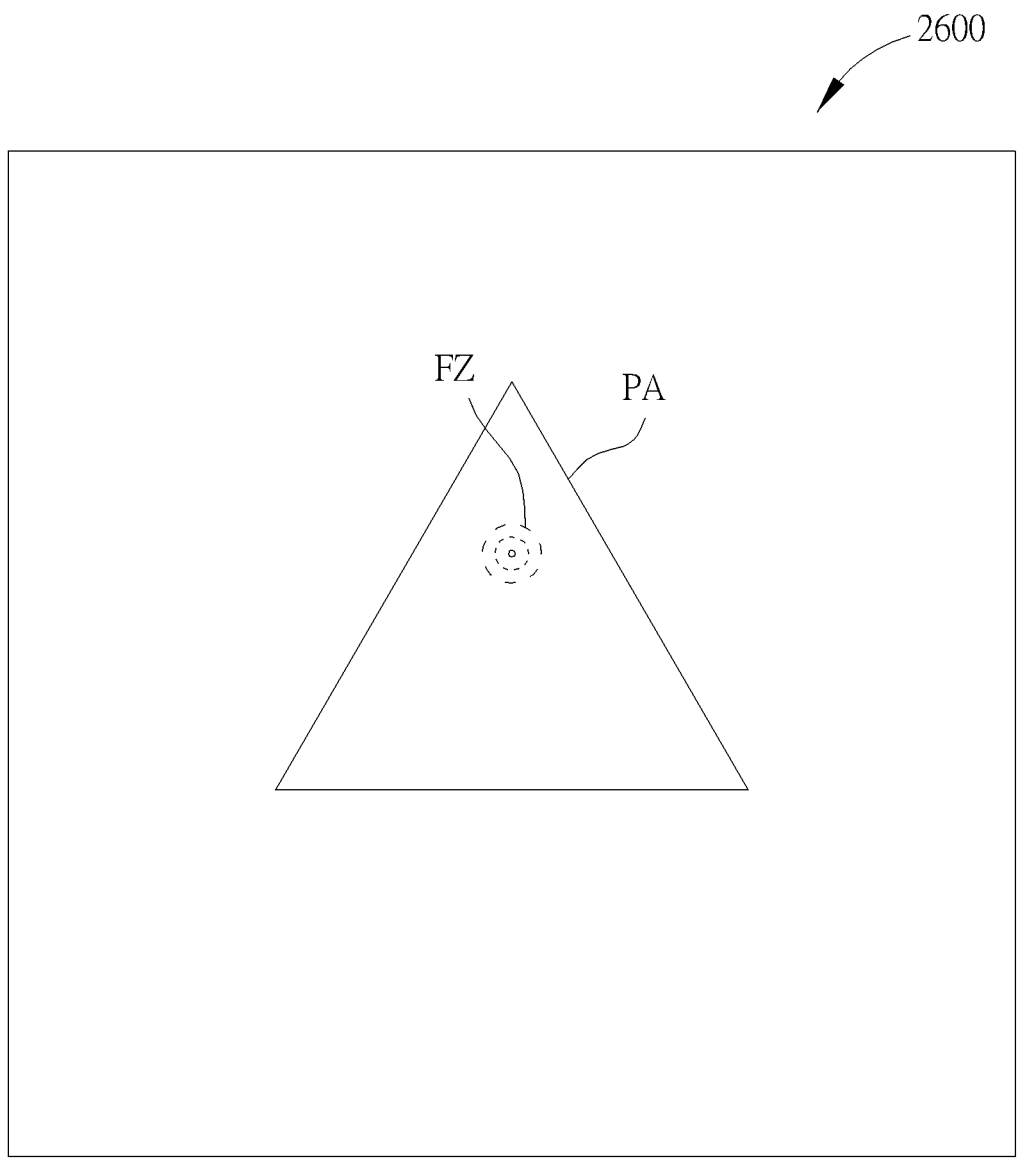

FIG. 26 illustrates an antenna 2600 according to another embodiment. The antenna 2600 can be one of the first antenna 110 and the second antenna 120 shown in FIG. 14A. The antenna 2600 can be similar to the antenna 2200; however, as shown in FIG. 26, the patch PA can have a triangular shape.

Figure 27:
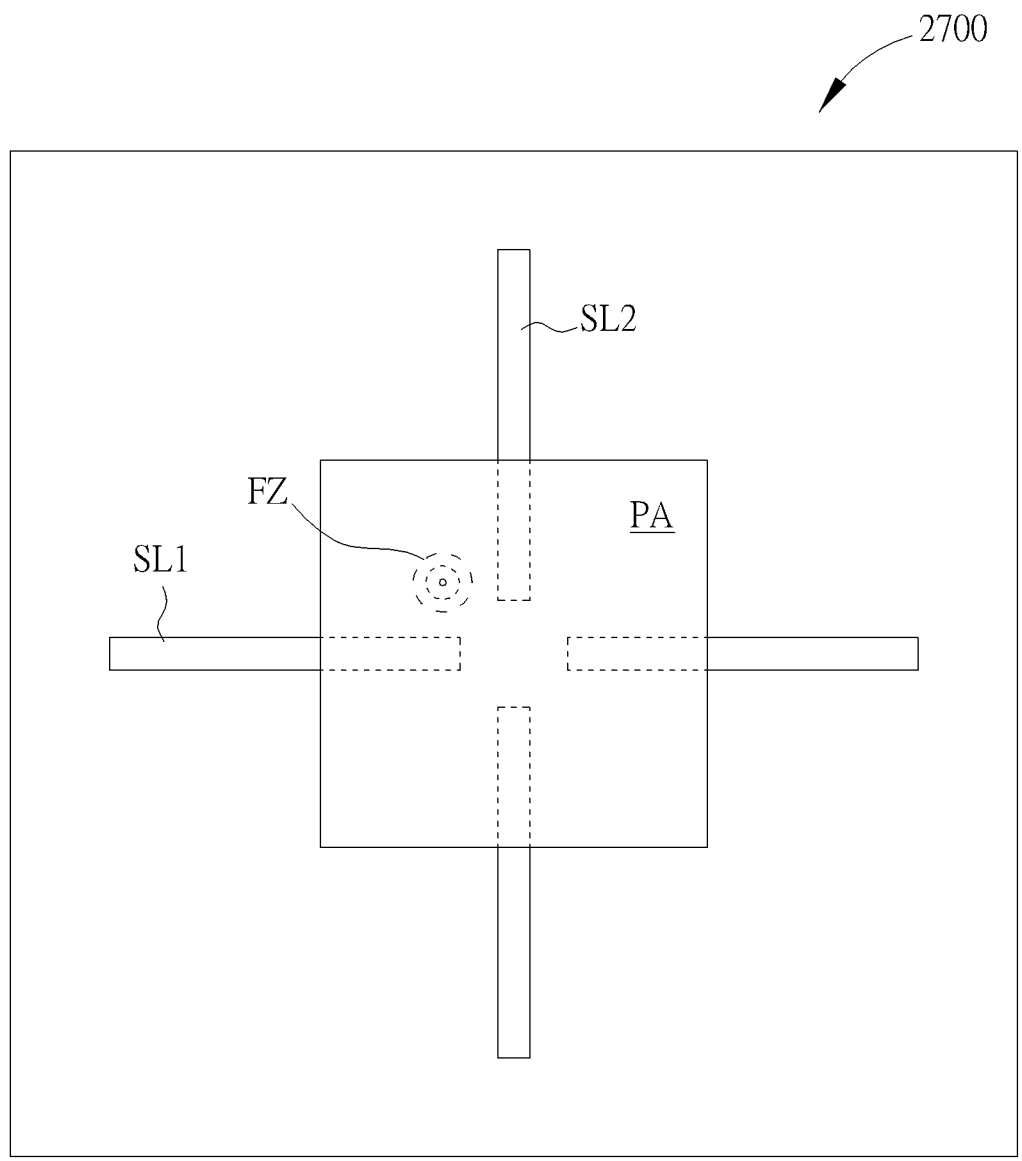

FIG. 27 illustrates an antenna 2700 according to another embodiment. The antenna 2700 can be one of the first antenna 110 and the second antenna 120 shown in FIG. 14A. The antenna 2700 can be similar to the antenna 2200, and further include a first slot SL1 and a second slot SL2. The first slot SL1 and the second slot SL2 can be formed on the ground. The feed zone FZ related to the patch PA can be between the first slot SL1 and the second slot SL2.

Figure 28:
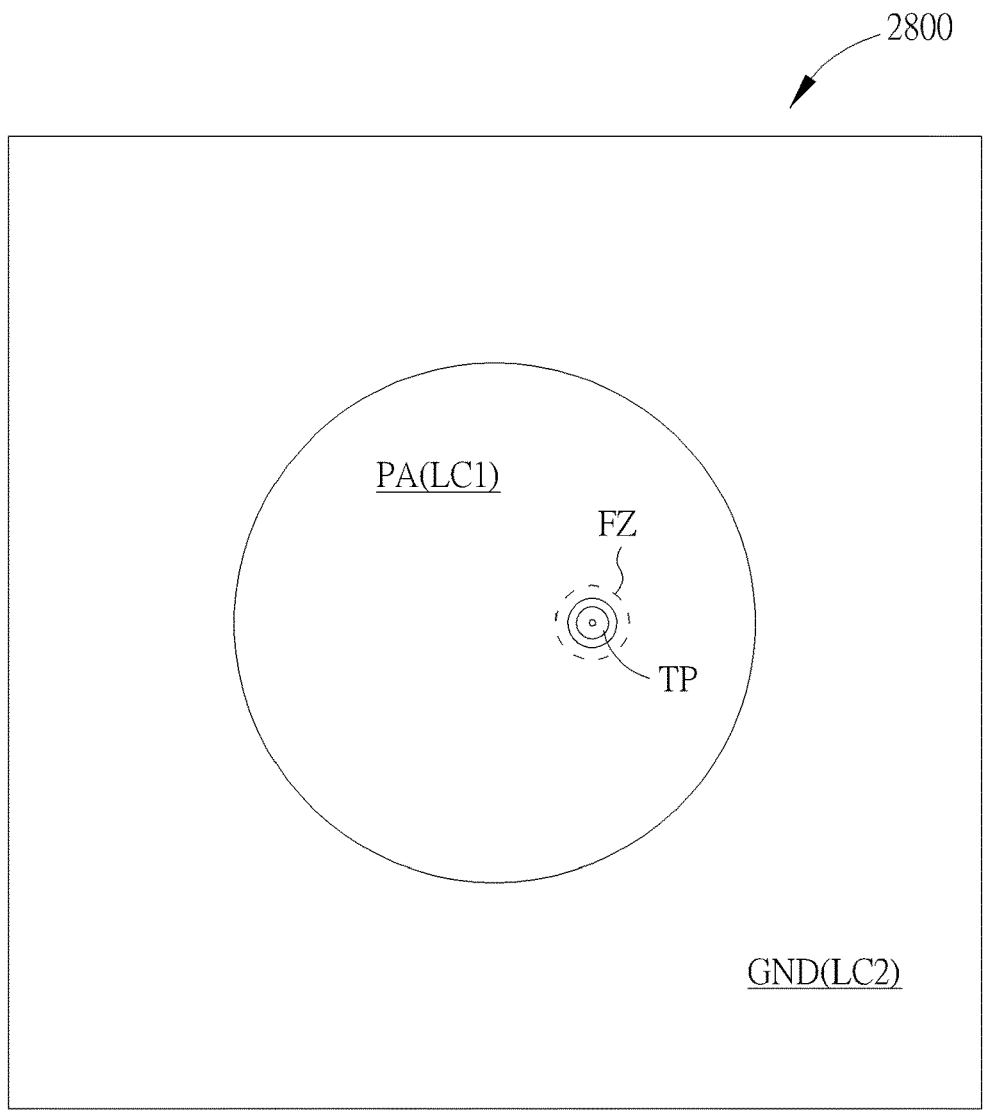
Figure 29:
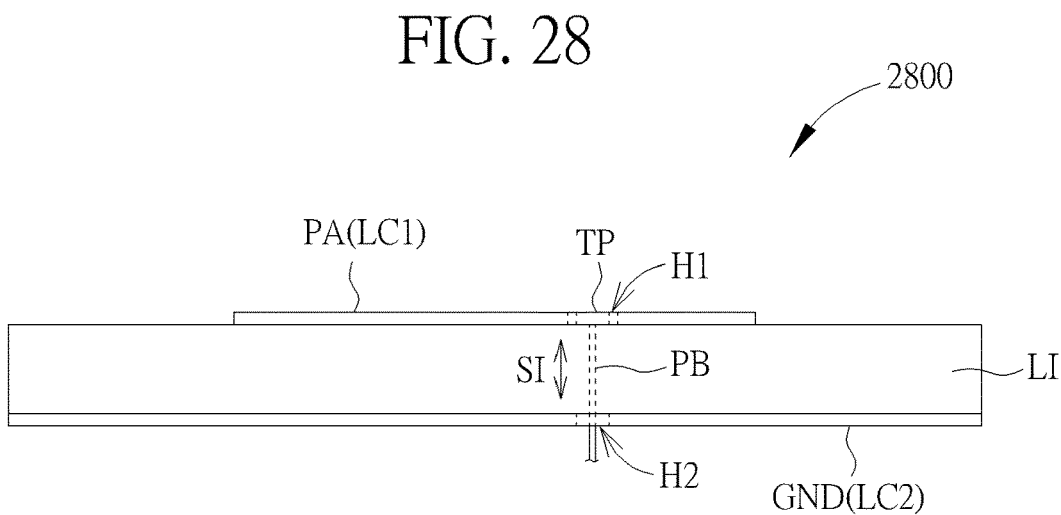

FIG. 28 and FIG. 29 respectively illustrate a top view and a side view of an antenna 2800 according to another embodiment. The antenna 2800 can be one of the first antenna 110 and the second antenna 120 shown in FIG. 14A. The antenna 2800 can include a patch PA, a ground GND, an insulation layer LI, a conductive top portion TP and a probe PB. The patch PA can be formed on a first conductive layer LC1 and include a first hole H1. The ground GND can be formed on a second conductive layer LC2 and include a second hole H2. The insulation layer LI can be formed between the first conductive layer LC1 and the second conductive layer LC2. The conductive top portion TP can be formed by using the first conductive layer LC1. The conductive top portion TP can be located in the first hole H1. The probe PB can be disposed through the second hole H2, can include a first terminal coupled to the conductive top portion TP and a second terminal, and can be used to access an internal signal SI, where the internal signal SI can be the first internal signal SI1 or the second internal signal SI2. The first hole H1 and the second hole H2 can overlap the feed zone related to the patch PA. The probe PB and the conductive top portion TP can be insulated from each of the first conductive layer LC1 and the second conductive layer LC2.

Figure 30:
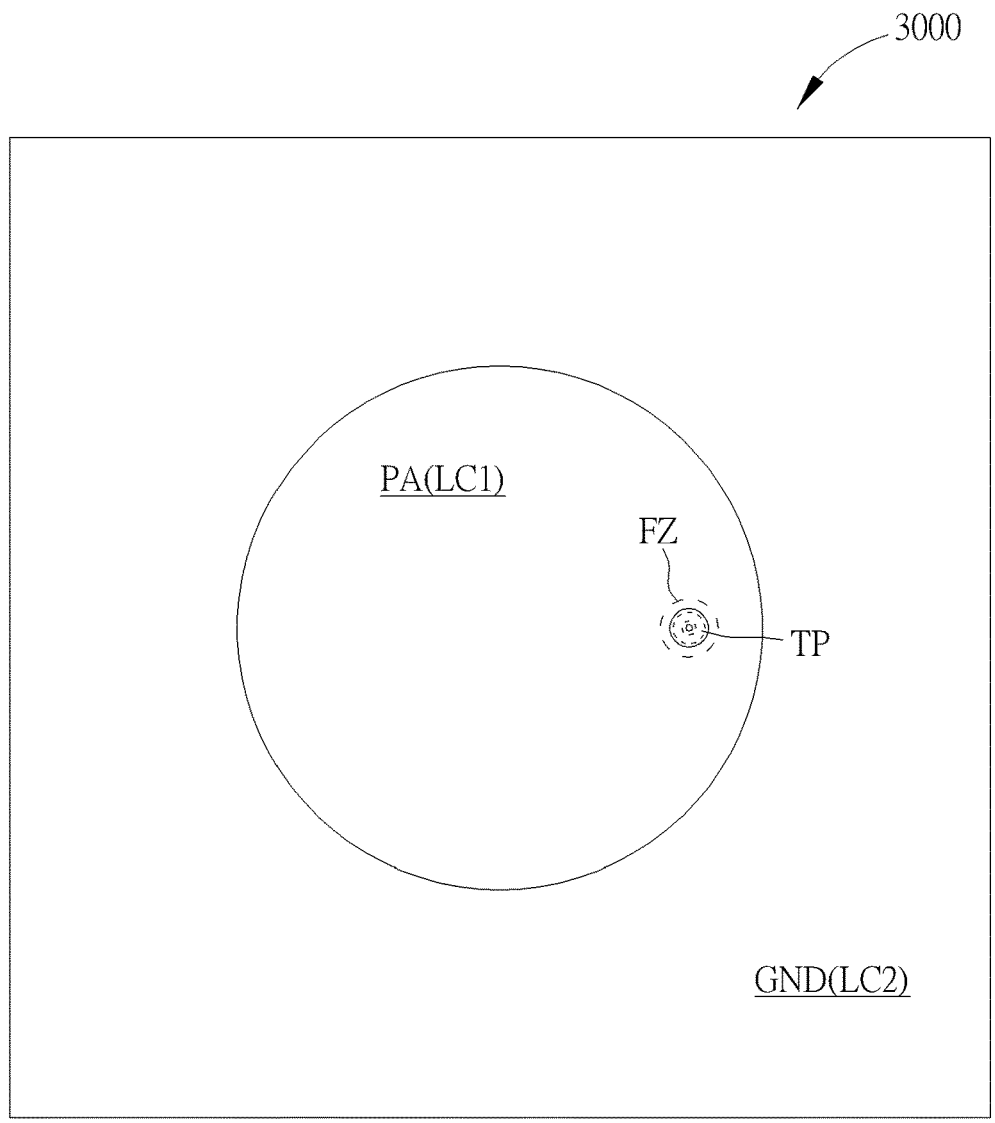
Figure 31:
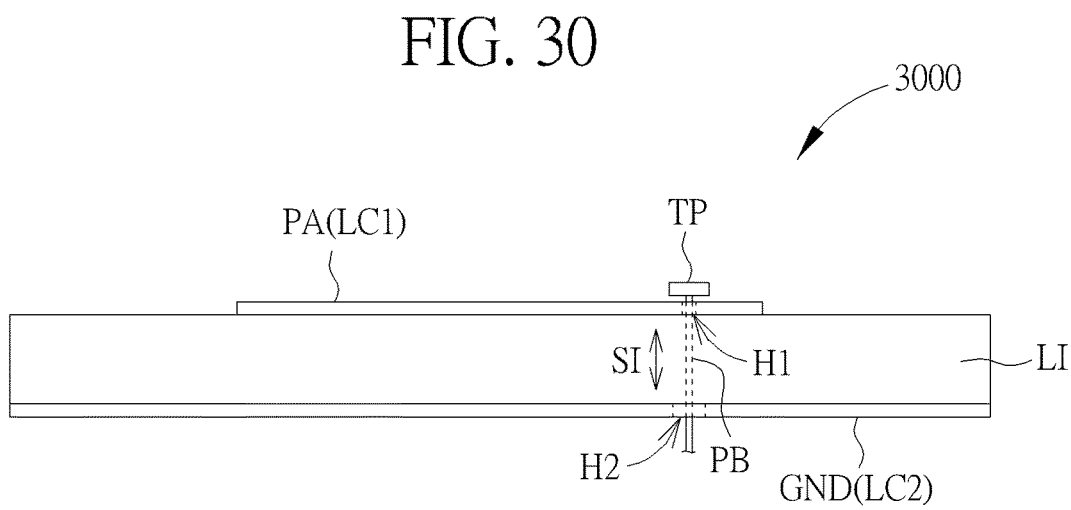

FIG. 30 and FIG. 31 respectively illustrate a top view and a side view of an antenna 3000 according to another embodiment. The antenna 3000 can be one of the first antenna 110 and the second antenna 120 shown in FIG. 14A. The antenna 3000 can be similar to the antenna 2800; however, the conductive top portion TP can be located above the first hole H1 in the antenna 3000.

Figure 32:
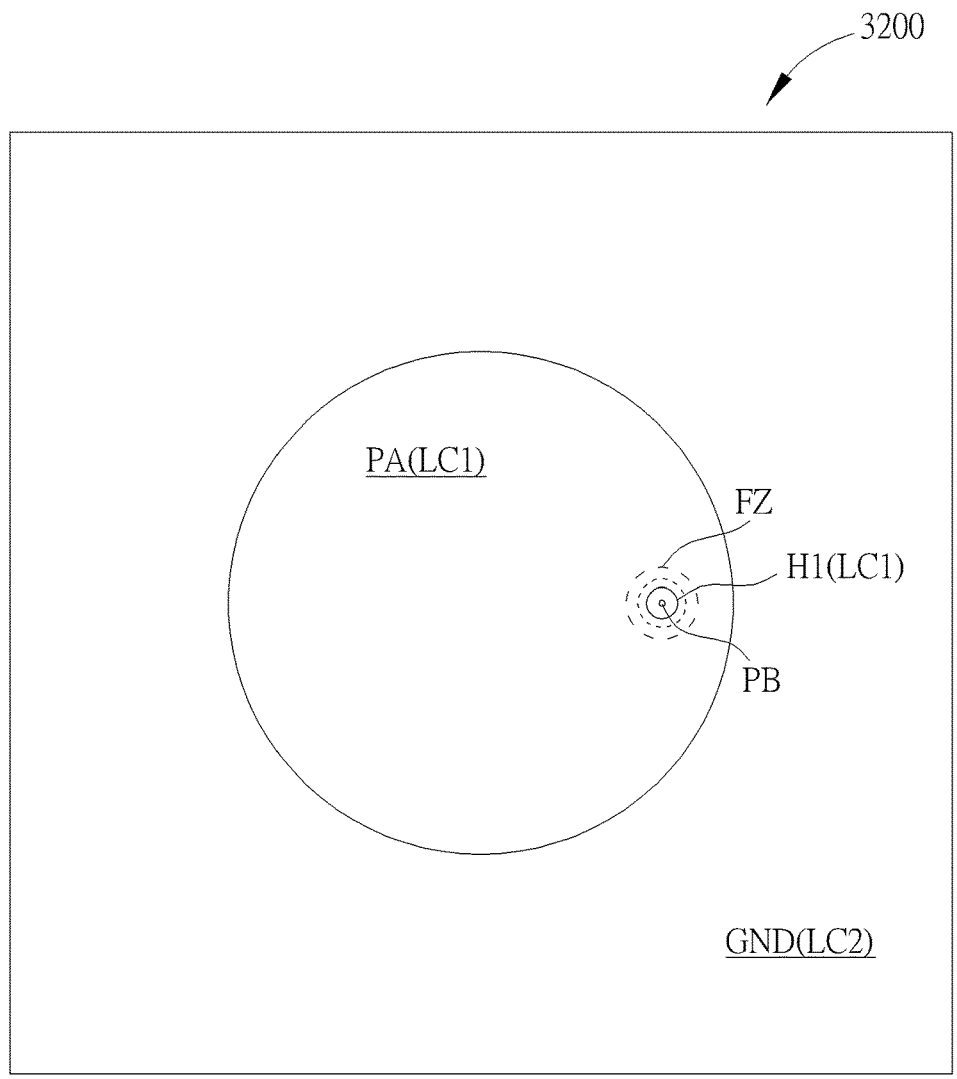
Figure 33:
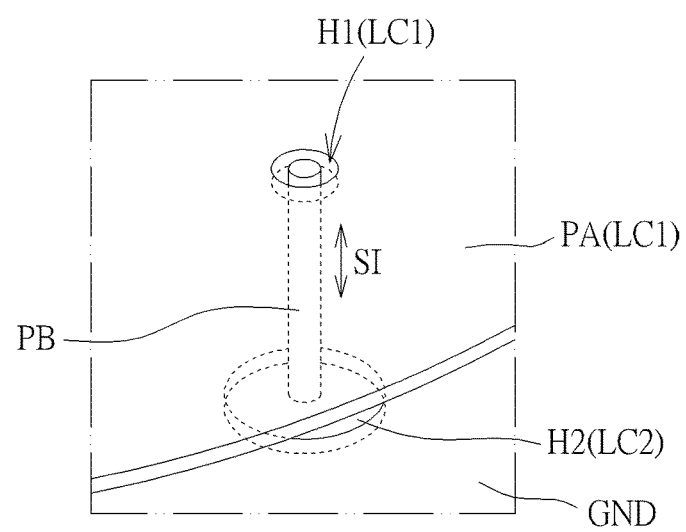

FIG. 32 and FIG. 33 respectively illustrate a top view and a side view of an antenna 3200 according to another embodiment. The antenna 3200 can be can be one of the first antenna 110 and the second antenna 120 shown in FIG. 14A. The antenna 3200 can include a patch PA, a ground GND, an insulation layer, and a probe PB. The patch PA can be formed on a first conductive layer LC1 and include a first hole H1. The ground GND can be formed on a second conductive layer LC2 and include a second hole H2. The insulation layer can be located between the first conductive layer LC1 and the second conductive layer LC2. The probe PB can be disposed through the second hole H2, include a first terminal and a second terminal, and be used to access an internal signal SI, where the internal signal SI can be the first internal signal SI1 or the second internal signal SI2. The first terminal of the probe PB can be in the first hole H1. The first hole H1 and the second hole H2 can overlap the feed zone FZ related to the patch PA. The probe PB can be insulated from each of the first conductive layer LC1 and the second conductive layer LC2.

Figure 34:
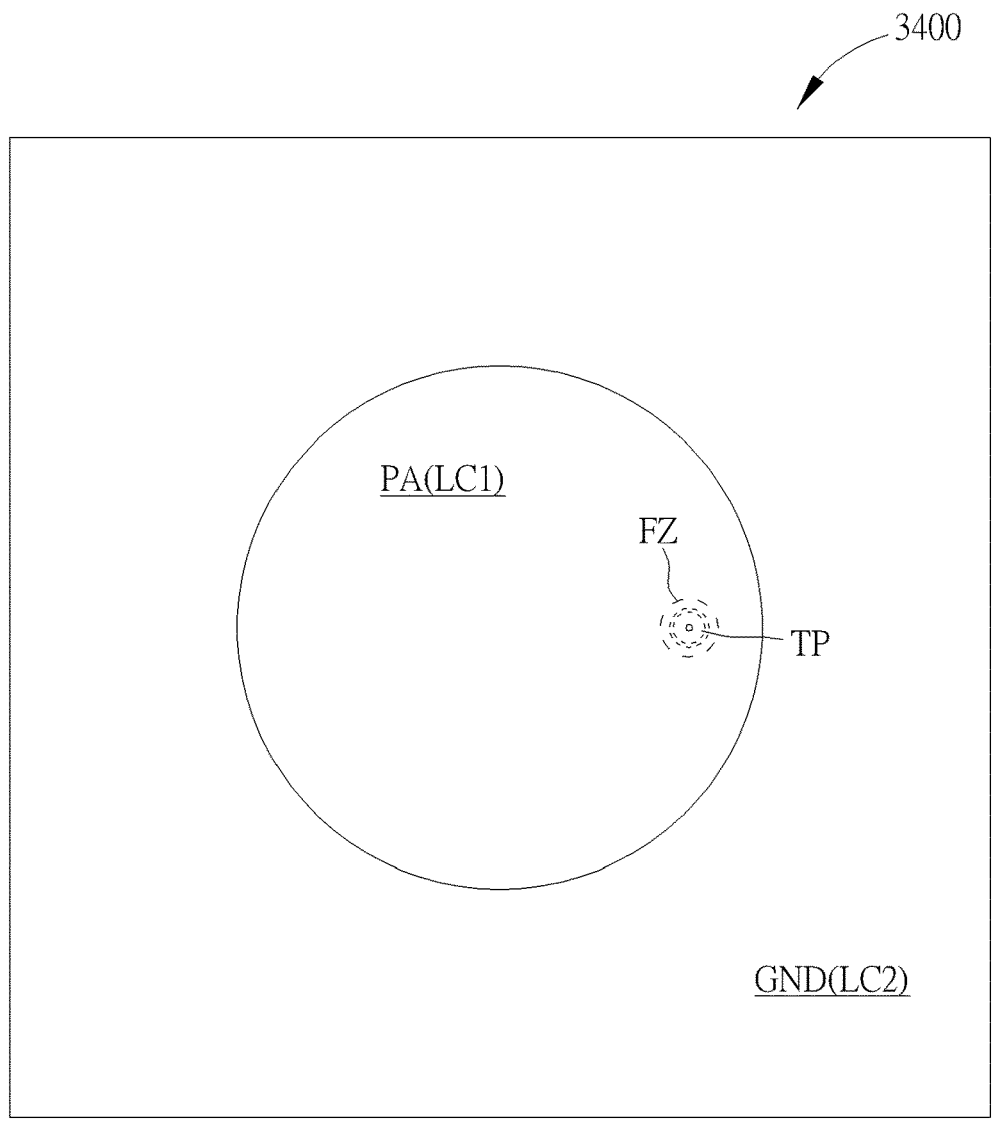
Figure 35:
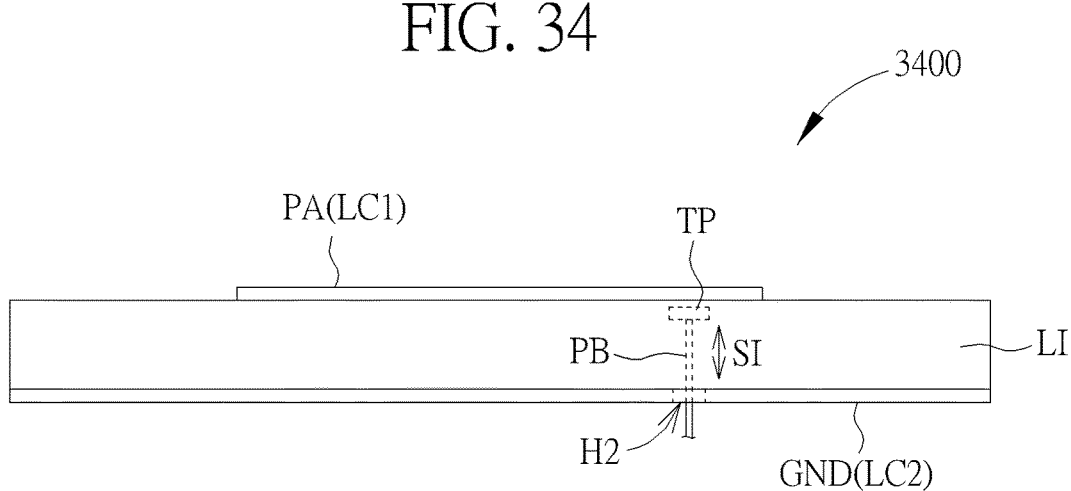

FIG. 34 and FIG. 35 respectively illustrate a top view and a side view of an antenna 3400 according to another embodiment. The antenna 3400 can be one of the first antenna 110 and the second antenna 120 shown in FIG. 14A. The antenna 3400 can include a patch PA, a ground GND, an insulation layer LI, a conductive top portion TP and a probe PB. The patch PA can be formed on a first conductive layer LC1. The ground GND can be formed on a second conductive layer LC2 and include a hole H2. The insulation layer LI can be located between the first conductive layer LC1 and the second conductive layer LC2. The conductive top portion TP can be located between the first conductive layer LC1 and the second conductive layer LC2. The probe PB can be disposed through the hole H2, include a first terminal coupled to the conductive top portion TP and a second terminal, and be used to access an internal signal SI. The internal signal SI can be the first internal signal SI1 or the second internal signal SI2. The hole H2 can overlap the feed zone FZ related to the patch PA. The probe PB and the conductive top portion TP can be insulated from each of the first conductive layer LC1 and the second conductive layer LC2.

Figure 36:
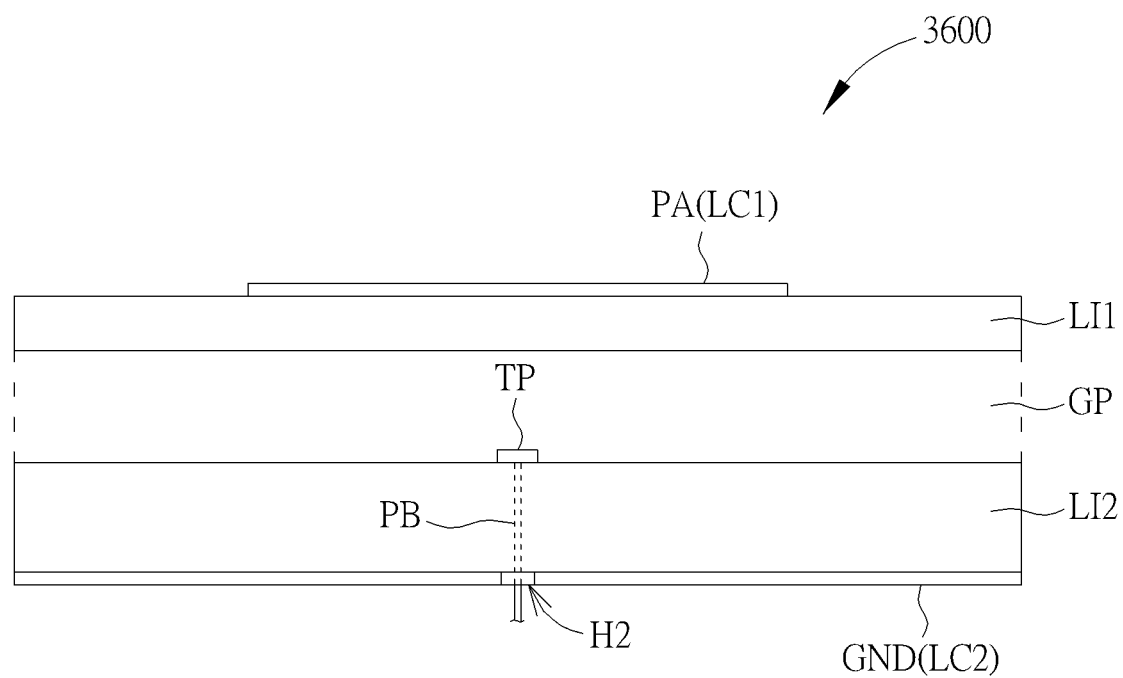

FIG. 36 illustrates a side view of an antenna 3600 according to another embodiment. The antenna 3600 can be one of the first antenna 110 and the second antenna 120 shown in FIG. 14A. The antenna 3600 can include a patch PA, a ground GND, a first insulation layer LI1, a second insulation layer LI2, a gap GP, a conductive top portion TP and a probe PB. The patch PA can be formed on a first conductive layer LC1. The ground GND can be formed on a second conductive layer LC2 and have a hole H2. The first insulation layer LI1 can be located between the first conductive layer LC1 and the second conductive layer LC2. The second insulation layer LI2 can be located between the first insulation layer LI1 and the second conductive layer LC2. The second insulation layer LI2 can include a first side and a second side, where the second conductive layer LC2 can at the second side. The gap GP can be located between the first insulation layer LI1 and the second insulation layer LI2. The conductive top portion TP can be located at the first side of the second insulation layer LI2. The probe PB can be disposed through the second insulation layer LI2, include a first terminal coupled to the conductive top portion TP and a second terminal, and be used to access an internal signal SI. The internal signal SI can be the first internal signal SI1 or the second internal signal SI2. The conductive top portion TP can overlap the feed zone related to the patch PA, and the probe PB and the conductive top portion TP can be insulated from each of the first conductive layer LC1 and the second conductive layer LC2.

Figure 37:
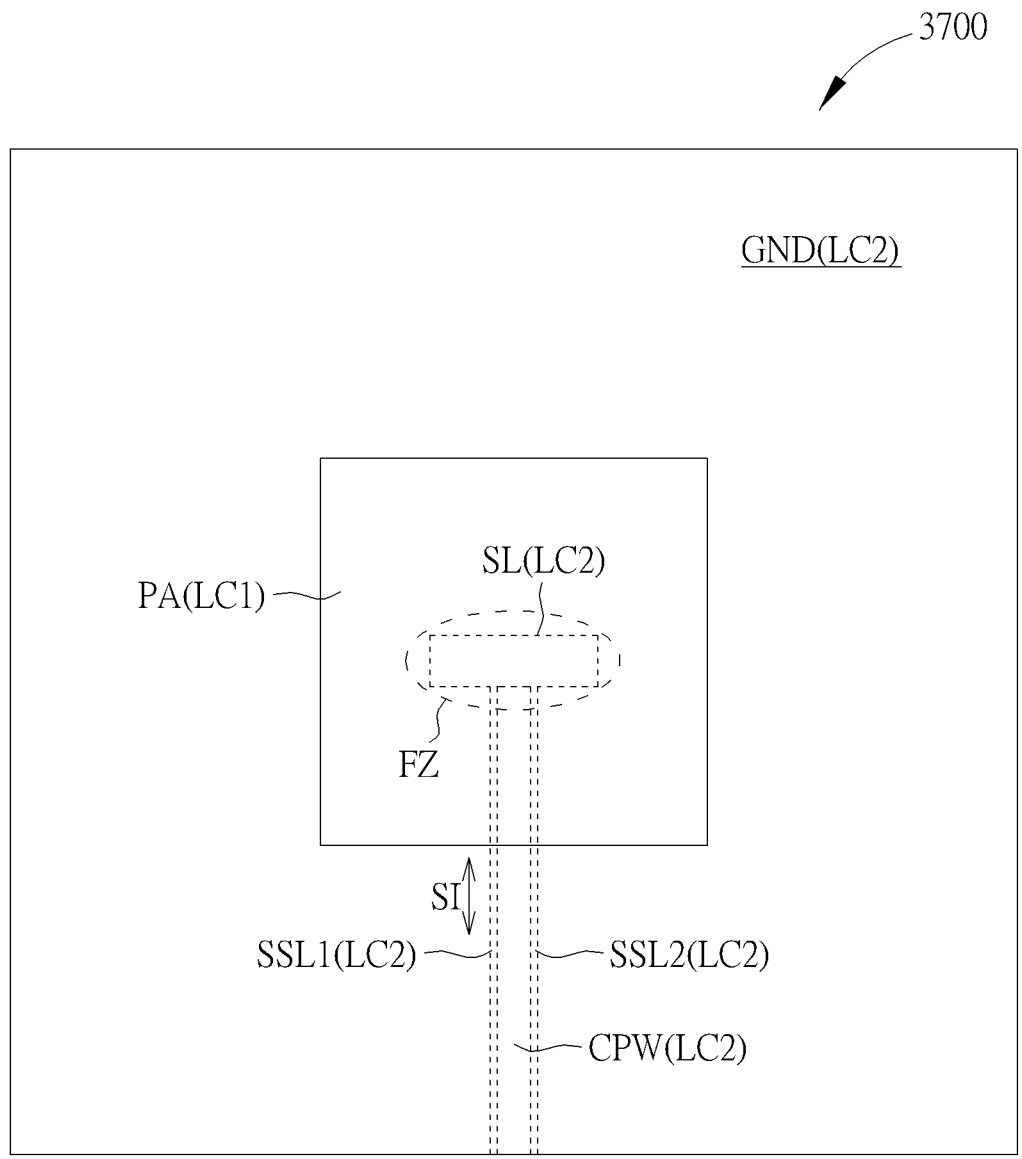

FIG. 37 illustrates an antenna 3700 according to another embodiment. The antenna 3700 can be one of the first antenna 110 and the second antenna 120 shown in FIG. 14A. The antenna 3700 can include a patch PA, a ground GND, an insulation layer, a slot SL and two straight slots SSL1 and SSL2. The patch PA can be formed on a first conductive layer LC1. The ground GND can be formed on a second conductive layer LC2. The insulation layer can be located between the first conductive layer LC1 and the second conductive layer LC2. The slot SL can be generated on the second conductive layer LC2 and located to overlap the feed zone FZ related to the patch PA. The two straight slots SSL1 and SSL2 can be generated on the second conductive layer LC2 and inwardly extended from an edge or an inner portion of the ground GND to the slot SL. The two straight slots SSL1 and SSL2 can be parallel or angular with one another. A portion between the two straight slots SSL1 and SSL2 can be used as a coplanar waveguide (CPW) for accessing an internal signal SI. The internal signal SI can be the first internal signal SI1 or the second internal signal SI2.

Figure 38:
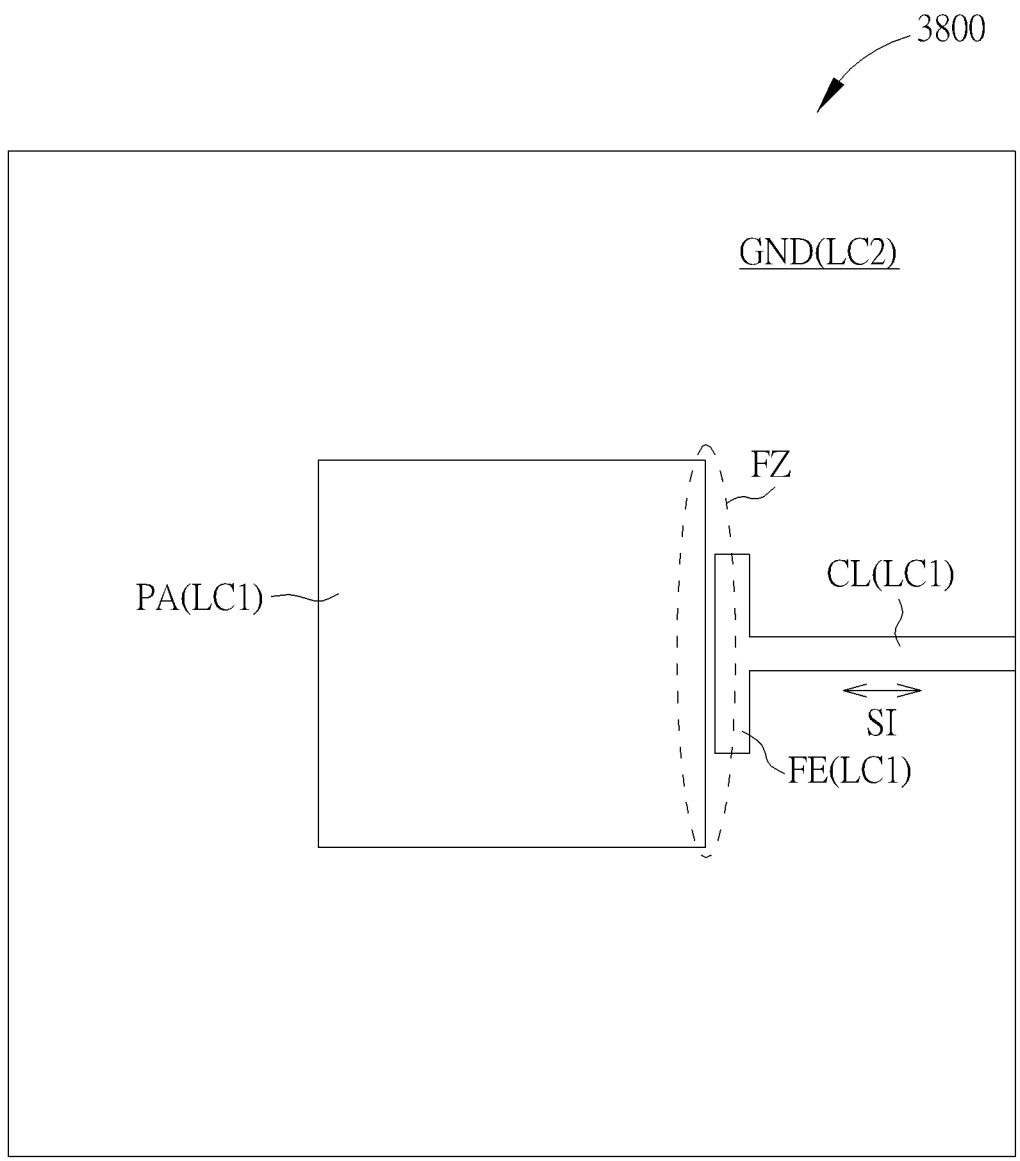

FIG. 38 illustrates an antenna 3800 according to another embodiment. The antenna 3800 can be one of the first antenna 110 and the second antenna 120 shown in FIG. 14A. The antenna 3800 can include a patch PA, a feed element FE and a conductive line CL. The patch PA can be formed on a conductive layer LC1. The feed element FE can be formed on the conductive layer LC1 and located corresponding to the feed zone FZ related to the patch PA. The conductive line CL can be formed on the conductive layer LC1, coupled to the feed element FE, and used to access an internal signal SI. The internal signal SI can be the first internal signal SI1 or the second internal signal SI2. The feed element FE can be insulated from the patch PA.

Figure 39:
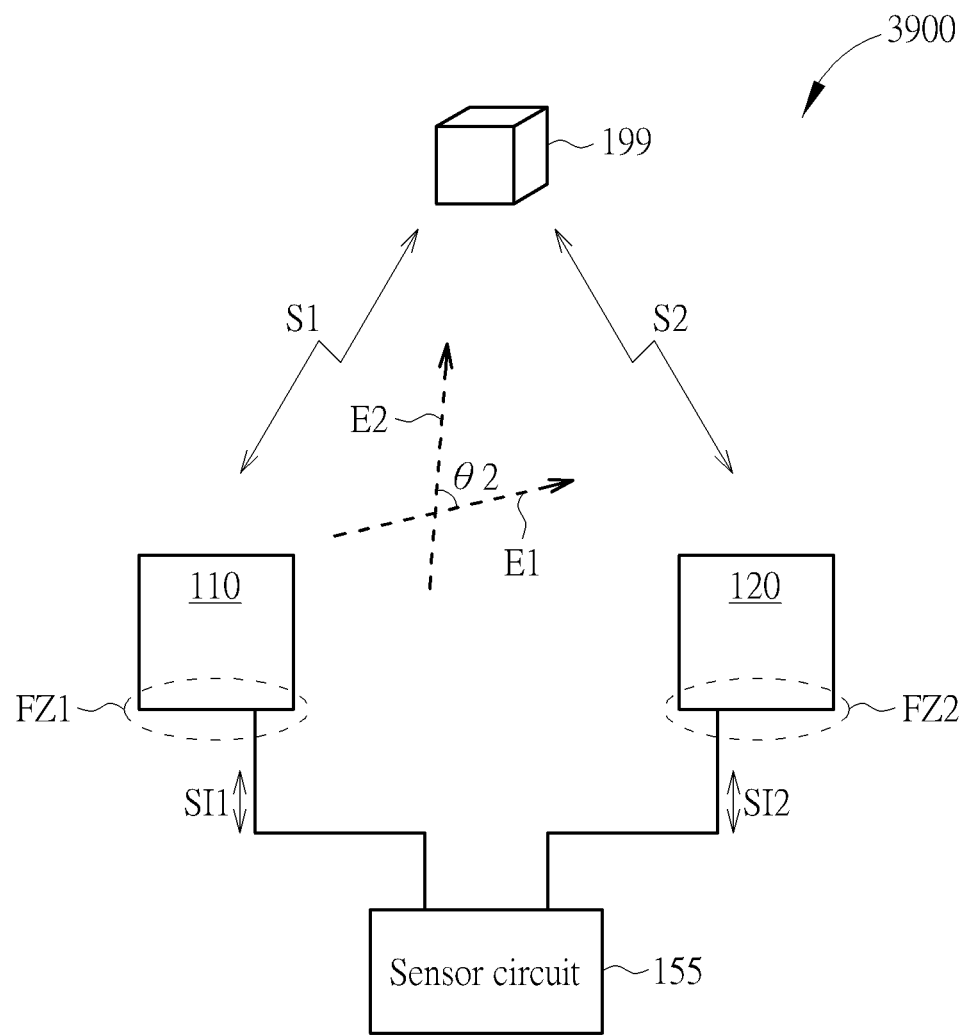
FIG. 39 illustrates a radar device for detecting spatial information of an object according to another embodiment.

FIG. 39 illustrates a radar device 3900 for detecting spatial information of an object 199 according to another embodiment. The radar device 3900 can be similar to the radar device 1400 shown in FIG. 14A; however, the relationship between the two antennas in the radar device 3900 can be defined by the angle θ2 between two co-polarizations as described below. The radar device 3900 can include a first antenna 110 and a second antenna 120. The first antenna 110 can be used to access a first wireless signal S1 and form a first radiated electric-field E1 having a first co-polarization according to the first wireless signal S1. The first antenna 110 can have a feed zone FZ1 used to access a first internal signal SI1 corresponding to the first wireless signal S1 between the first antenna 110 and a sensor circuit 155. The second antenna 120 can be used to access a second wireless signal S2 and form a second radiated electric-field E2 having a second co-polarization according to the second wireless signal S2. The second antenna can have another feed zone FZ2 used to access a second internal signal SI2 corresponding to the second wireless signal S2 between the second antenna 120 and the sensor circuit 155. An angle θ2 formed between the first co-polarization and the second co-polarization is not less than 45 degrees and is not larger than 90 degrees in a far field. It can be expressed as $45° \leq \theta2 \leq 90°$. One of the first wireless signal S1 and the second wireless signal S2 can be reflected by the object 199 to form the other one of the first wireless signal S1 and the second wireless signal S2. The sensor circuit 155 can be used to detect the spatial information of the object 199 according to at least the first internal signal SI1 and the second internal signal SI2.

Each of the first antenna 110 and the second antenna 120 mentioned in FIG. 14A and FIG. 39 can be as shown in FIG. 15 to FIG. 38. In other words, the first antenna 110 and the second antenna 120 mentioned in FIG. 14A and FIG. 39 can be of the same structure or different structures.

In summary, by using the radar device 1400 and the radar device 3900 shown in FIG. 14A, FIG. 15 and FIG. 39, the isolation between the first antenna 110 and the second antenna 120 is improved. For example, the isolation can be improved by at least 3 dB according to experiments. As a result, high isolation among antennas is achieved, and unwanted interference caused by the polarizations of the antennas is avoided. The performance of detecting the object is improved.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A radar device for detecting a spatial information of an object, comprising:
   a first antenna configured to access a first wireless signal, comprising:
      a first middle point at a centroid of the first antenna; and
      a feed zone having a first zone shape centroid, and configured to access a first internal signal corresponding to the first wireless signal between the first antenna and a sensor circuit; and
   a second antenna configured to access a second wireless signal, comprising:
      a second middle point at a centroid of the second antenna; and
      another feed zone having a second zone shape centroid, and configured to access a second internal signal corresponding to the second wireless signal between the second antenna and the sensor circuit;
   wherein an angle formed between a first straight line and a second straight line is not less than 45 degrees and is not larger than 90 degrees, the first straight line passes through the first zone shape centroid and the first middle point, the second straight line passes through the second zone shape centroid and the second middle point, one of the first wireless signal and the second wireless signal is reflected by the object to form another one of the first wireless signal and the second wireless signal, and the sensor circuit is configured to detect the spatial information of the object according to at least the first internal signal and the second internal signal.

2. The radar device of claim 1, wherein one of the first antenna and the second antenna comprises:
   a patch formed on a first conductive layer;
   a conductive line formed on the first conductive layer, coupled between the patch and the sensor circuit, and configured to access the first internal signal or the second internal signal accordingly;
   a ground formed on a second conductive layer; and
   an insulation layer located between the first conductive layer and the second conductive layer.

3. The radar device of claim 1, wherein one of the first antenna and the second antenna comprises:
   a patch formed on a first conductive layer;
   a ground formed on a second conductive layer;
   a conductive line formed on a third conductive layer, disposed to overlap the feed zone related to the patch, and configured to access the first internal signal or the second internal signal accordingly;
   a first insulation layer located between the first conductive layer and the third conductive layer; and
   a second insulation layer located between the second conductive layer and the third conductive layer;
   wherein the third conductive layer is located between the first conductive layer and the second conductive layer.

4. The radar device of claim 1, wherein one of the first antenna and the second antenna comprises:
   a patch formed on a first conductive layer;
   a conductive line formed on a second conductive layer, disposed to overlap the feed zone related to the patch, and configured to access the first internal signal or the second internal signal accordingly;
   a ground formed on a third conductive layer;
   a slot generated on the third conductive layer and located between the conductive line and the patch;
   a first insulation layer located between the first conductive layer and the third conductive layer; and
   a second insulation layer located between the third conductive layer and the second conductive layer;
   wherein the third conductive layer is between the first conductive layer and the second conductive layer.

5. The radar device of claim 4, wherein:
   the slot has a rectangular shape, an H shape, a circular shape, an oval shape or an irregular shape; and
   the feed zone related to the patch is located near a side of the patch, a center of the patch or a corner of the patch.

6. The radar device of claim 1, wherein one of the first antenna and the second antenna comprises:
   a patch formed on a first conductive layer;
   a ground formed on a second conductive layer;
   a hole generated on the second conductive layer and disposed to overlap the feed zone related to the patch;
   a probe disposed through the hole, comprising a first terminal coupled to the patch and a second terminal, and configured to access the first internal signal or the second internal signal accordingly; and
   an insulation layer located between the first conductive layer and the second conductive layer.

7. The radar device of claim 6, further comprising:
   a first slot formed on the patch and disposed to cut off a first part of an edge of the patch; and
   a second slot formed on the patch and disposed to cut off a second part of the edge of the patch;
   wherein the feed zone related to the patch is located between the first slot and the second slot.

8. The radar device of claim 6, further comprising:
   a first slot formed on the patch; and
   a second slot formed on the patch;
   wherein the first slot and the second slot have a substantially same shape, and the feed zone related to the patch is between the first slot and the second slot.

9. The wireless radar device of claim 8, wherein each of the first slot and the second slot has an L shape so as to have a first part, a second part and a turning point connected to the first part and the second part, and the patch has a rectangular shape with four sides, and the first part of each of the first slot and the second slot is substantially parallel to one of the sides of the patch.

10. The radar device of claim 6, further comprising:
    a first slot generated on the ground; and
    a second slot generated on the ground;
    wherein the feed zone related to the patch overlaps an area between the first slot and the second slot.

11. The radar device of claim 1, wherein one of the first antenna and the second antenna comprises:
    a patch formed on a first conductive layer and comprising a first hole;
    a ground formed on a second conductive layer and comprising a second hole;
    an insulation layer located between the first conductive layer and the second conductive layer;
    a conductive top portion located in or above the first hole; and
    a probe located through the second hole, comprising a first terminal coupled to the conductive top portion and a second terminal, and configured to access the first internal signal or the second internal signal accordingly;
    wherein the first hole and the second hole overlap the feed zone related to the patch, the probe and the conductive top portion is insulated from each of the first conductive layer and the second conductive layer.

12. The radar device of claim 1, wherein one of the first antenna and the second antenna comprises:
a patch formed on a first conductive layer and comprising a first hole;
a ground formed on a second conductive layer and comprising a second hole;
an insulation layer located between the first conductive layer and the second conductive layer; and
a probe located through the second hole, comprising a first terminal and a second terminal, and configured to access the first internal signal or the second internal signal accordingly;
wherein the first terminal of the probe is in the first hole, the first hole and the second hole overlap the feed zone related to the patch, the probe is insulated from each of the first conductive layer and the second conductive layer.

13. The radar device of claim 1, wherein one of the first antenna and the second antenna comprises:
a patch formed on a first conductive layer;
a ground formed on a second conductive layer and comprising a hole;
an insulation layer located between the first conductive layer and the second conductive layer;
a conductive top portion located between the first conductive layer and the second conductive layer; and
a probe located through the hole, comprising a first terminal coupled to the conductive top portion and a second terminal, and configured to access the first internal signal or the second internal signal accordingly;
wherein the hole overlaps the feed zone related to the patch, and the probe and the conductive top portion are insulated from each of the first conductive layer and the second conductive layer.

14. The radar device of claim 1, wherein one of the first antenna and the second antenna comprises:
a patch formed on a first conductive layer;
a ground formed on a second conductive layer and comprising a hole;
a first insulation layer located between the first conductive layer and the second conductive layer;
a second insulation layer located between the first insulation layer and the second conductive layer and comprising a first side and a second side wherein the second conductive layer is at the second side;
a gap located between the first insulation layer and the second insulation layer;
a conductive top portion located at the first side of the second insulation layer; and
a probe disposed through the second insulation layer, comprising a first terminal coupled to the conductive top portion and a second terminal, and configured to access the first internal signal or the second internal signal accordingly;
wherein the conductive top portion overlaps the feed zone related to the patch, and the probe and the conductive top portion are insulated from each of the first conductive layer and the second conductive layer.

15. The radar device of claim 1, wherein one of the first antenna and the second antenna comprises:
a patch formed on a first conductive layer;
a ground formed on a second conductive layer;
an insulation layer located between the first conductive layer and the second conductive layer;
a slot generated on the second conductive layer and located to overlap the feed zone related to the patch; and
two straight slots generated on the second conductive layer and inwardly extended from an edge or an inner portion of the ground to the slot;
wherein the two straight slots are parallel or angular with one another, and a portion between the two straight slots is used as a coplanar waveguide for accessing the first internal signal or the second internal signal accordingly.

16. The radar device of claim 1, wherein one of the first antenna and the second antenna comprises:
a patch formed on a conductive layer;
a feed element formed on the conductive layer and located corresponding to the feed zone related to the patch; and
a conductive line formed on the conductive layer, coupled to the feed element, and configured to access the first internal signal or the second internal signal accordingly;
wherein the feed element is insulated from the patch.

17. The radar device of claim 1, wherein one of the first antenna and the second and the second antenna comprises:
a patch formed on a conductive layer, configured to access the first wireless signal or the second wireless signal;
wherein:
the patch has an aperture and/or a slot; and/or
the patch has a shape generated by adding a smaller shape to a larger shape or by removing the smaller shape from the larger shape.

18. The radar device of claim 1, wherein:
the first antenna comprises a first patch configured to access the first wireless signal;
the second antenna comprises a second patch configured to access the second wireless signal; and
the first patch and the second patch have different shapes.

19. The radar device of claim 1, wherein:
the first wireless signal and the second wireless signal have a wavelength;
the first antenna and the second antenna are separated with a distance; and
the distance is not less than wavelength/16 and is not larger than 3*wavelength.

20. A radar device for detecting a spatial information of an object, comprising:
a first antenna configured to access a first wireless signal and form a first radiated electric-field having a first co-polarization according to the first wireless signal, the first antenna comprising:
a feed zone configured to access a first internal signal corresponding to the first wireless signal between the first antenna and a sensor circuit; and
a second antenna configured to access a second wireless signal and form a second radiated electric-field having a second co-polarization according to the second wireless signal, the second antenna comprising:
another feed zone configured to access a second internal signal corresponding to the second wireless signal between the second antenna and the sensor circuit;
wherein an angle formed between the first co-polarization and the second co-polarization is not less than 45 degrees and is not larger than 90 degrees in a far field, one of the first wireless signal and the second wireless signal is reflected by the object to form another one of the first wireless signal and the second wireless signal, and the sensor circuit is configured to detect the spatial information of the object according to at least the first internal signal and the second internal signal.

\* \* \* \* \*